United States Patent [19]

Moriya et al.

[11] Patent Number: 5,165,071
[45] Date of Patent: Nov. 17, 1992

[54] DIGITAL COLOR COPYING MACHINE

[75] Inventors: Shigeru Moriya; Yoshihiko Hirota, both of Osaka, Japan

[73] Assignee: Minolta Camera Kabushiki Kaisha, Osaka, Japan

[21] Appl. No.: 382,175

[22] Filed: Jul. 19, 1989

[30] Foreign Application Priority Data

Jul. 20, 1988 [JP] Japan .................. 63-182282
Jul. 29, 1988 [JP] Japan .................. 63-191199

[51] Int. Cl.⁵ ................. H04N 1/40; H04N 1/00; G03F 3/08
[52] U.S. Cl. ......................... 358/443; 358/75; 358/80; 358/405; 358/406
[58] Field of Search ............. 358/443, 444, 445, 448, 358/450, 451, 452, 453, 77, 78, 80, 75, 458, 460, 462, 466

[56] References Cited

U.S. PATENT DOCUMENTS

| | | | |
|---|---|---|---|
| 4,231,069 | 10/1980 | Wellendorf et al. | 358/450 |
| 4,270,146 | 5/1981 | Adachi | 358/450 |
| 4,275,958 | 6/1981 | Tachika et al. | 355/313 |
| 4,387,297 | 6/1983 | Swartz et al. | 235/462 |
| 4,517,658 | 5/1985 | Iida | 364/900 |
| 4,603,262 | 7/1986 | Eastman et al. | 250/566 |
| 4,642,699 | 2/1987 | Ohi | 358/450 |
| 4,674,861 | 6/1987 | Kawamura | 364/525 |
| 4,680,642 | 7/1987 | Shimano et al. | 358/462 |
| 4,691,238 | 9/1987 | Yamada | 358/450 |
| 4,755,852 | 7/1988 | Fujita | 355/208 |
| 4,794,419 | 12/1988 | Shibazaki et al. | 355/202 |
| 4,825,246 | 4/1989 | Fukuchi et al. | 355/202 |
| 4,876,571 | 10/1989 | Nakamura et al. | 355/210 |
| 5,032,928 | 7/1991 | Sakai et al. | 358/450 |

FOREIGN PATENT DOCUMENTS

| | | | |
|---|---|---|---|
| 49-131317 | 4/1973 | Japan . | |
| 54-104834 | 8/1979 | Japan . | |
| 55-123270 | 9/1980 | Japan . | |
| 56-83757 | 7/1981 | Japan . | |
| 57-61372 | 4/1982 | Japan . | |
| 57-61376A | 4/1982 | Japan | 358/450 |
| 60-216670 | 10/1985 | Japan . | |
| 60-239764 | 11/1985 | Japan . | |

Primary Examiner—Edward L. Coles, Sr.
Assistant Examiner—Thomas D. Lee
Attorney, Agent, or Firm—Burns, Doane, Swecker & Mathis

[57] ABSTRACT

A digital color copying machine comprising a memory for storing a multi-level image signal or a binary image signal is disclosed. In a superimpose mode of the copying machine, after an image signal of a first document image stored in the memory is read out, the first document image is superimposed on a second document image on a copying paper.

9 Claims, 28 Drawing Sheets

DIGITAL COLOR COPYING MACHINE

BACKGROUND OF THE INVENTION

1. Field of the Invention

The present invention relates to a digital color copying machine, and more particularly, to a digital color copying machine comprising a superimpose mode.

2. Description of the Related Art

A conventional digital color copying machine comprises a reading section for reading an image of a document by using a color image sensor and converting the image of the document into image data for printing, and a printer section for printing an image of the document on a copying paper according to the image data. In the case that plural color images are to be superimposed on a copying paper, the document is read out repeatedly by the reading section, and each color image is printed on the same copying paper by the printer section in the order of respective colors predetermined.

In a superimpose mode of the digital color copying machine, after an image for superimposing is read out from the document, image data thereof is stored in a memory. Thereafter, after the image data stored in the memory is read out, the image of the image data is superimposed on another image of a copying paper.

In the digital color copying machine comprising the superimpose mode, after the image for superimposing is read out from the document, the multi-level read image data thereof of R, G and B colors is binarized to binary image data of yellow, magenta and cyan color, and then, the binary image data is stored in the memory. In copying machine, there results an advantage that the capacity of the memory becomes small, however, a disadvantage results in that a color adjustment can not made and a magnification varying process cannot be performed for the binary image data stored in the memory.

Another digital color copying machine comprising the superimpose mode has been proposed. In the copying machine, the multi-level read image data is stored in the memory in order to superimpose the image thereof on another image. A disadvantage results in that the capacity of the memory becomes large, however, an advantage results in that a color adjustment can be made and a magnification varying process can be performed for the image data stored in the memory.

SUMMARY OF THE INVENTION

An essential object of the present invention is to provide a digital color copying machine comprising a superimpose mode which is able to store multi-level image data or binary image data of an image for superimposing in a memory.

Another object of the present invention is to provide a digital color copying machine comprising a superimpose mode which is able to store image data of plural images for superimposing in a memory.

According to one aspect of the present invention, there is provided a digital copying machine comprising: image reading means for reading a document image so as to generate a multi-level image signal corresponding to the density of the document image; image signal correction means for correcting the multi-level image signal generated by said image reading means; converting means for converting the corrected multi-level image signal outputted from said image signal correction means into a binary image signal; image forming means for forming an image on a copying paper in accordance with the binary image signal outputted from said converting means; memory means for storing the multi-level or binary image signal; mode selecting means for selecting a first mode for storing the multi-level image signal in said memory means and a second mode for storing the binary image signal in said memory means; connecting means for connecting said memory means with the input terminal of said image correction means so as to store a multi-level image signal of a first document in said memory means when the first mode is selected by said mode selecting means, and for connecting said memory means with the output terminal of said converting means so as to store a binary image signal in said memory means when the second mode is selected by said mode selecting means; and superimposing means for connecting said memory means with the input terminal of said image signal correction means or said image forming means upon forming an image of a second document so as to read out the multi-level or binary image signal stored in said memory means and superimpose the image of the first document on the image of the second document on a copying paper.

According to another aspect of the present invention, there is provided an image forming apparatus comprising: binarizing circuit for converting a multi-level image signal corresponding to the density of the image into a binary image signal; image forming means for forming an image in accordance with the binary image signal outputted from said binarizing circuit; memory means for storing a binary image signal or a multi-level image signal; selecting means for selecting to store a multi-level image signal or to store a binary image signal is said memory means; writing circuit for storing a multi-level image signal of a first image before conversion of said binarizing circuit when storing a multi-level image signal is selected by said selecting means, and for storing the binary image signal of the first image after conversion of said binarizing circuit when storing a binary image signal is selected by said selecting means; and reading circuit for reading out the multi-level image signal or the binary image signal of the first image stored in said memory means; wherein a multi-level image signal is outputted to said image forming means through the binarizing circuit when a multi-level image signal is read out from said memory means, and a binary image signal is outputted directly to said image forming means when a binary image signal is read out from said memory means.

According to a further aspect of the present invention, there is provided a binary copying machine comprising: image reading means for reading a document image so as to generate a image signal of the document image; memory means for storing the image signal, memory means having a capacity for storing plural images; image forming means for forming an image on a copying paper in accordance with the image signal generated by said image reading means; register means for registering the image signal generated by said image reading means in the memory means; selecting means for selecting a desirable image from plural images stored in said memory means; and superimposing means for reading out the image signal of the image selected by said selecting means from said memory means upon forming an image by said image forming means in accordance with the image signal outputted from said image reading means, and for superimposing the document image read by said image reading means on the image registered in said memory means.

According to a still further aspect of the present invention, there is provided an image forming apparatus comprising: image signal generating means for generating an image signal; image forming means for forming an image in accordance with the image signal outputted from said image signal generating means; memory means for storing plural images; and superimposing means for reading out an image from said memory means upon forming an image by said image forming means and for superimposing the image outputted from said image signal generating means on the image stored in said memory means.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

Figure 1:
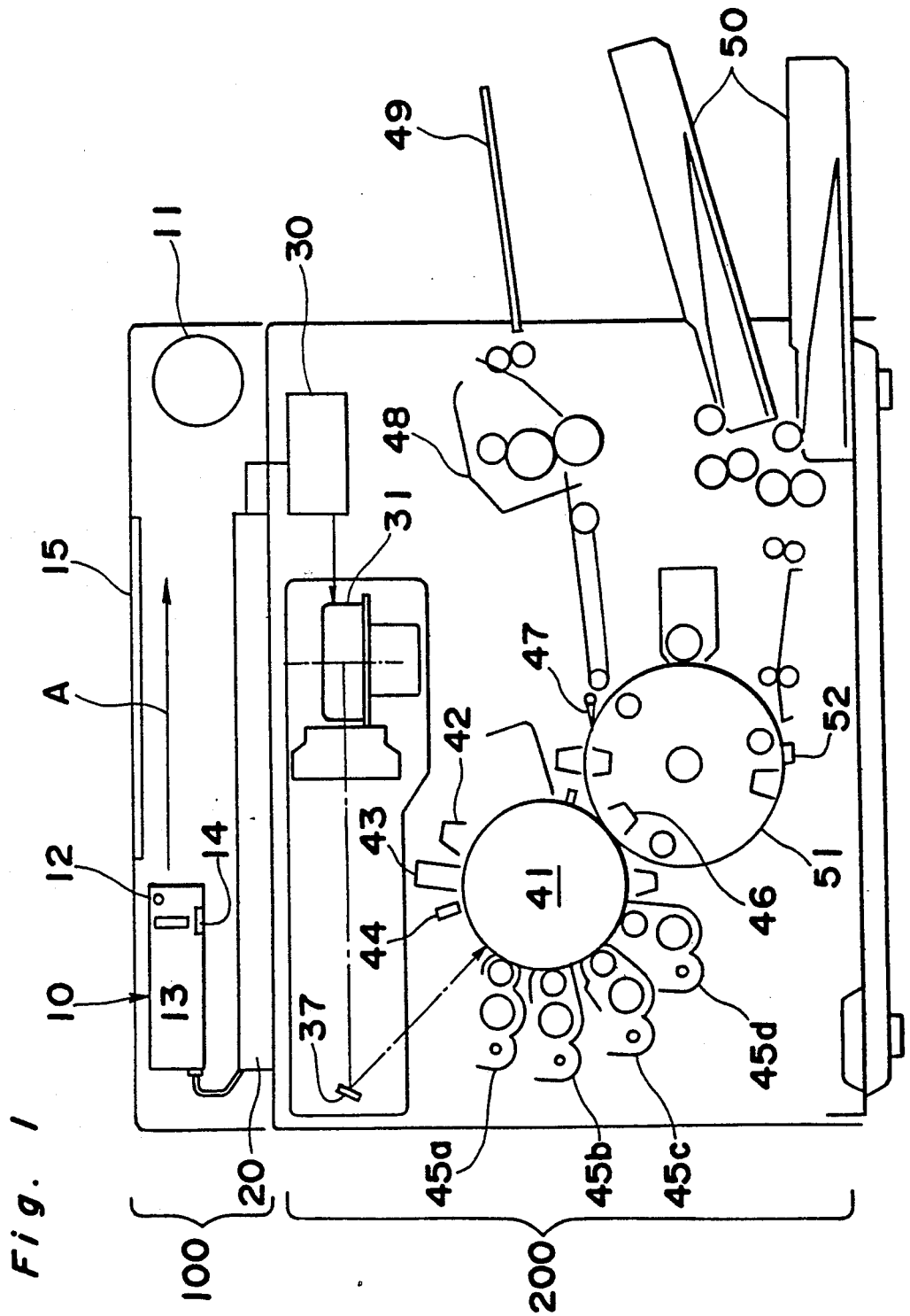
FIG. 1 is a schematic longitudinal cross sectional view of a digital color copying machine of the preferred embodiment according to the present invention.

The preferred embodiment according to the present invention will be described below in the order of the following items, with reference to the attached drawings.

(1) Composition of digital color copying machine
(2) Superimpose function
(3) Mosaic monitor
(4) Image memory circuit
(4-1) Composition of image memory circuit
(4-2) Superimpose mode for storing a multi-level image signal
(4-3) Magnification varying
(4-4) Storing and reading processing of image data in the mosaic monitor mode
(4-5) Superimpose mode for storing a binary full color image signal
(4-6) Superimpose mode for storing a binary monocolor image signal
(4-7) Mode for storing both multi-level image signal and binary image signal
(4-8) Area judgment circuit and Address generating counter
(4-9) Storing and reading processing of plural images
(5) Color tone setting circuit
(6) Control flow of copying operation
(1) Composition of digital color copying machine A digital color copying machine of the preferred embodiment according to the present invention comprises a reading section 100 for reading an image of a document by using an image sensor and converting the image of the document into image data, and a printer section 200 for printing the image corresponding to the image data on a copying paper using the electrophotographic process. In the copy machine, a multi-color copy is obtained by repeating an image reading process by the image reading section 100 and an image forming process by the printer section 200 with respect to each of the printing colors.

That is, the reading section 100 reads the image of the document corresponding to respective colors of yellow, magenta and cyan, respectively, and outputs respective color image data to the printer section 200. The printer section 200 forms respective color images according to respective color image data outputted from the reading section 100. Thus, respective color images are superimposed on a copying paper so as to form a color image.

FIG. 1 shows the whole composition of the digital color copying machine of the preferred embodiment according to the present invention.

Referring to FIG. 1, a scanner 10 comprises an exposure lamp 12 for illuminating the document, a rod lens array 13 for condensing the light reflected from the document, and a CCD color image sensor 14 for converting the condensed light into an electrical signal. The scanner 10 is moved in a direction indicated by an arrow A by a motor 11 upon reading the document so as to scan the document set on a platen 15. The image of the document illuminated by a light source is converted into electric signals of red color, green color and blue color by the CCD color image sensor 14.

The electric signals outputted from the CCD color image sensor 14 are converted into binary image data corresponding to each of a red color image, a green color image and a blue color image of the document, and individual color image data is stored in a buffer memory 30.

Figure 2:
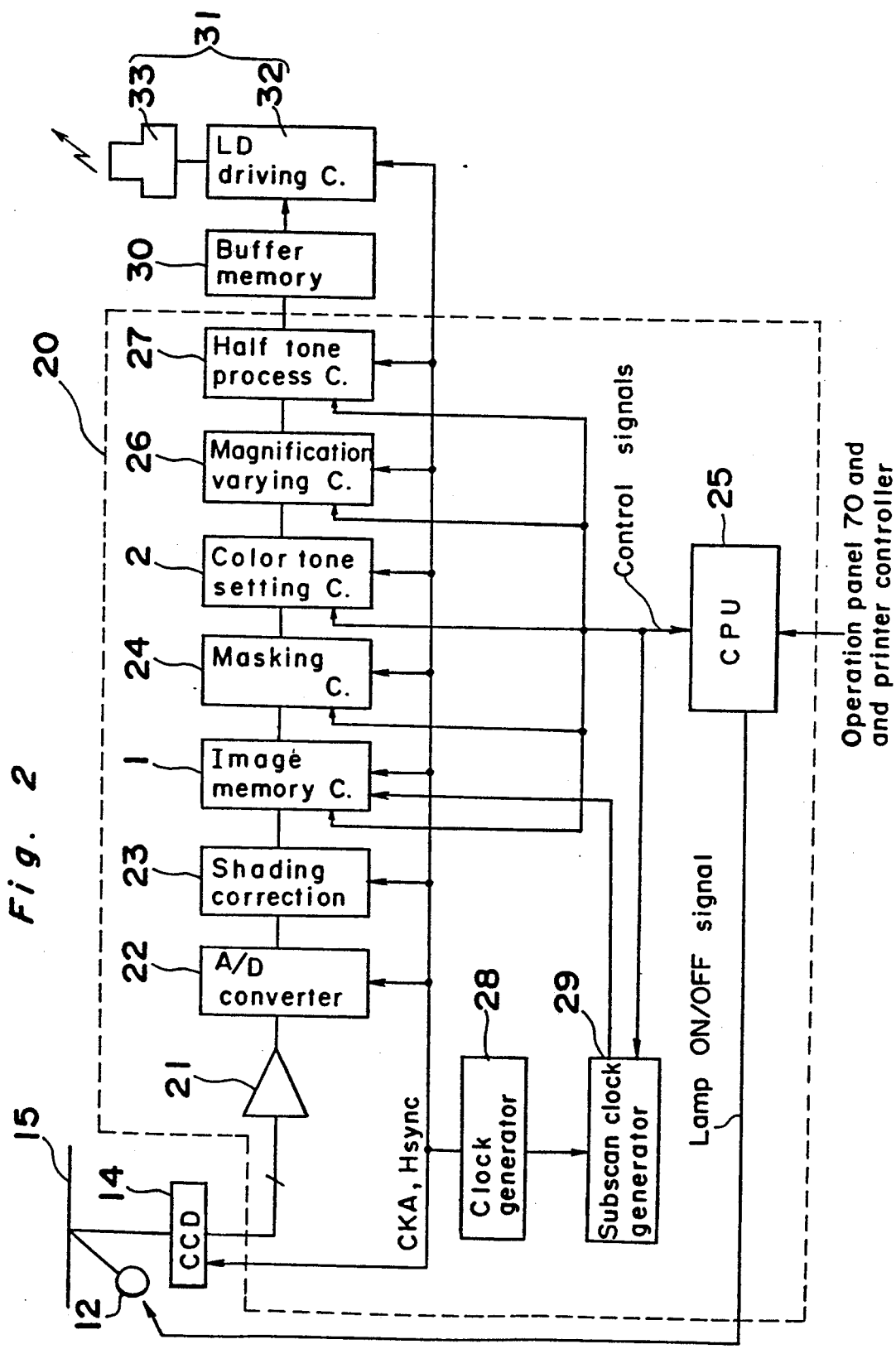
FIG. 2 is a schematic block diagram of a signal processing section shown in FIG. 1.

Referring to FIG. 2, a print head 31 comprises of an LD driving circuit 32 and a semiconductor laser (LD) 33. The LD driving circuit 32 drives the semiconductor laser 33 according to the image data read out from the buffer memory 30.

Referring back to FIG. 1, a laser beam generated from the semiconductor laser 33 is swept in the axial direction of a photoconductive drum 41 by an optical means (not shown) such as a polygon mirror etc., and is projected onto the surface of the rotating photoconductive drum 41 rotated through a reflection mirror 37. Then, the image of the document is formed on the surface of the photoconductive drum 41. Before the photoconductive drum 41 is projected by the above laser beam, it is illuminated by an eraser lamp 42, is electrified by a corona charger 43, and furthermore, is illuminated by an eraser lamp 44. Thereafter, the above laser beam is projected onto the surface of the photoconductive drum 41 so as to form an electrostatic latent image thereon. After either one of an yellow color toner developing unit 45a, a magenta color toner developing unit 45b, a cyan color toner developing unit 45c and a black color toner developing unit 45d is activated, the electrostatic latent image formed on the surface of the photoconductive drum 41 is developed into a visible toner image. The developed visible toner image is transferred onto a copying paper which is wound around a transfer drum 51.

The image forming process is repeated with respect to four colors (yellow, magenta, cyan and black) so as to form a color image on a copying paper. The scanner 10 is driven in synchronism with the rotations of the photoconductive drum 41 and the transfer drum 51 in the image forming process. Thereafter, a separating nail member 47 is enabled so that the copying paper is separated from the transfer drum 41, and thereafter, the copying paper is fixed by a fixing unit 48·and is discharged to a paper discharging tray 49.

It is to be noted that the copying paper is fed from a paper cassette 50, and the edge of the copying paper is chucked by a chucking mechanism 52 which is arranged around the transfer drum 51 so as to prevent an image from being shifted upon transferring the toner image thereon.

FIG. 2 shows a signal processing section 20 for processing the electric signals outputted from the CCD color image sensor 14 so as to output the binary image signals corresponding to the electric signals.

It is to be noted that the image memory circuit 1 is inserted into the next stage of the half tone processing circuit 27 when a binary image signal is stored in the image memory circuit 1.

Referring to FIG. 2, in the normal image forming process, the image signals outputted from the CCD color image sensor 14 are converted into electric signals corresponding to the density of the image by a logarithmic amplifier 21, and the electric signal outputted from the amplifier 21 is converted into a multi-level binary data by an analog/digital converter (referred to as an A/D converter hereinafter) 22. A shading correction is performed with respect to individual image data of red color, green color and blue color by a shading correction circuit 23. In the superimpose mode for storing a multi-level image signal and the mosaic monitor mode as described later, the image data outputted from the shading correction circuit 23 is stored in an image memory circuit 1. On the other hand, in the superimpose mode for storing a binary image signal and a normal printing mode for forming a normal color image on a copying paper, the image memory circuit 1 is disabled, the image data outputted from the shading correction circuit 23 is directly to a masking circuit 24.

Respective data of red color, green color and blue color are processed in parallel in the above data processing. Thereafter, the masking circuit 24 generates image data of one printing color of yellow color, magenta color, cyan color and black color from the image data of red color, green color and blue color according to the characteristics of the printing toner designated, wherein the printing color is determined responsive to a control signal input from a CPU 25.

The masking circuit 24 comprises an under color rejecting circuit and a black printing quantity generating circuit, and generates black image data when a black color document is scanned. In the superimpose mode for storing a binary image signal, the image signal is stored in the image memory circuit 1, temporarily. The color tone setting circuit 2 is used for making a color adjustment for a printing signal in the superimpose mode and in the mosaic monitor mode. When a standard color adjustment is made, the image signal outputted from the masking circuit 24 is input to the magnification varying circuit 26, directly.

The magnification varying circuit 26 electrically processes the image data outputted from the masking circuit 24 or the color tone setting circuit 2 so as to vary the magnification of the image whose magnification is varied in the main scan direction by a well known manner, and outputs the generated image data to a half tone processing circuit 27. On the other hand, the magnification in the subscan direction is varied by varying the velocity of the scanner 10 for scanning the document.

The half tone processing circuit 27 binarizes the image data outputted from the magnification varying circuit 26 so as to generate the binary pseudo half tone signals and store them in the buffer memory 30. The LD driving circuit 32 drives the semiconductor laser 33 so as to generate a laser beam according to the pseudo half tone signals outputted from the buffer memory 30.

On the other hand, a clock generator 28 generates a horizontal synchronizing signal Hsync and a clock signal CKA for synchronizing the reading action of the CCD color image sensor 14 with the image data processing of respective circuits of the signal processing section 20. Furthermore, a subscan clock generator 29 for varying the magnification generates a subscan clock for varying the magnification which is an interruption signal which is output to the image memory circuit 1 in accordance with a control signal outputted from the CPU 25.

The digital copying machine comprises the superimpose mode and the mosaic monitor mode as described later. In both the modes, a memory for storing image data is required, and a common image processing is performed. Therefore, the image memory circuit 1 and the color tone setting circuit 2 are used in common and both the modes are performed by control of the CPU 25.

Figure 3:
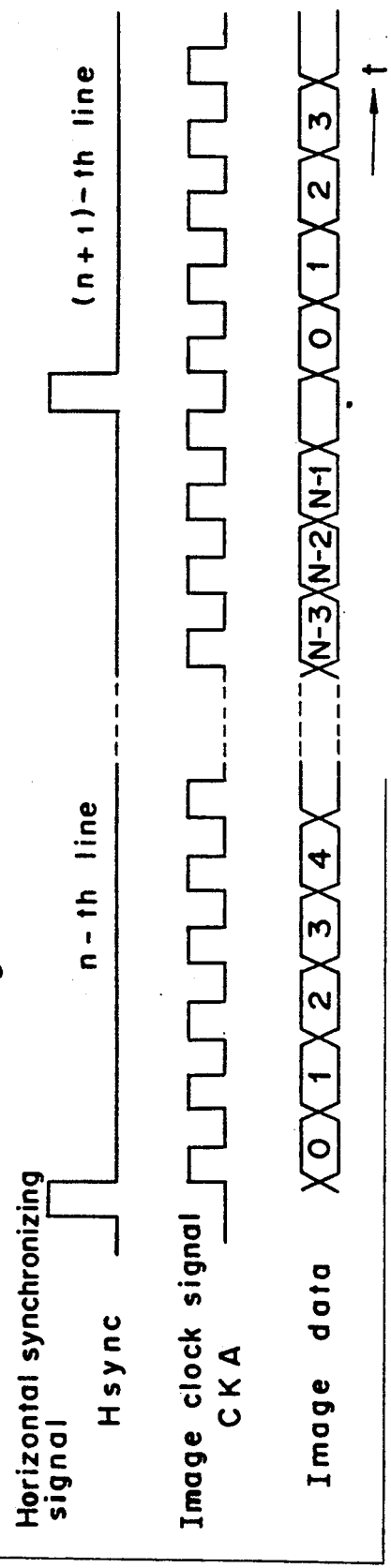
FIG. 3 is a timing chart showing an action of the signal processing section shown in FIG. 2.

FIG. 3 shows a timing chart of the image data which is processed in the signal processing section 20.

Referring to FIG. 3, the horizontal synchronizing signal Hsync and the clock signal CKA are generated by the clock generator 28, and the CCD color image sensor 14 outputs the image data of red color, green color and blue color serially in synchronism with the clock signal CKA. In FIG. 3, the numerals indicated in the individual image data denote addresses in the main scan direction. Every time the horizontal synchronizing signal Hsync is generated, the line n in the main scan direction is renewed. Then, the scanner 10 is moved in the subscan direction by a unit distance.

Figure 4:
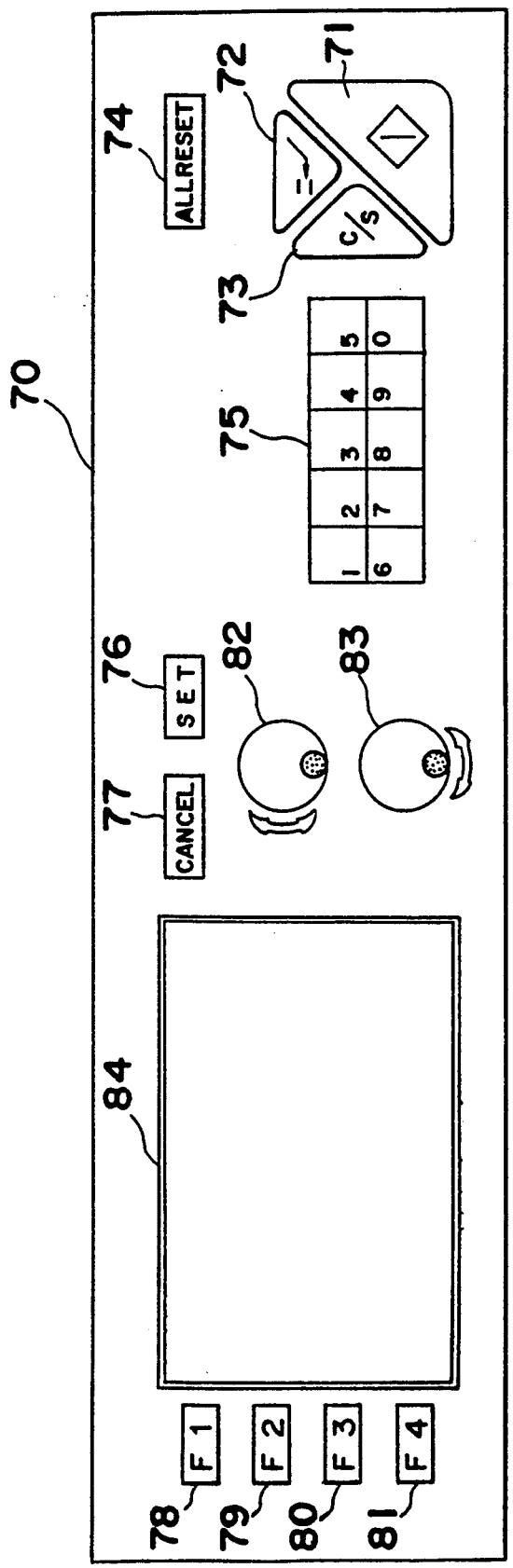
FIG. 4 is a top plan view of an operation panel of the digital color copying machine shown in FIG. 1.

FIG. 4 shows an operation panel 70 arranged on the main body of the copying machine.

Referring to FIG. 4, on the operation panel 70, there are arranged a print start key 71 for starting the copying operation, an interruption key 72 for instructing an interruption copying operation, a clear stop key 73, an all reset key 74, a set of ten keys 75, a set key 76, a cancel key 77, various kinds of function keys 78 to 81, jog dials 82 and 83 for setting the areas which are described later, a liquid crystal display section 84 for displaying the image of the document so as to set the above areas and displaying the various kinds of messages.

The function keys 78, 79 and 80 are the mosaic monitor mode selecting key, the superimpose mode selecting key, and the density correction key, respectively. Furthermore, the function keys 78 to 80 are used for instructing the superimpose mode for storing a multi-level image signal, binary color image signal and binary mono-color image signal, selecting or erasing the registered images.

The magnification is set by the ten keys 75. Furthermore, selection of the image mode such as the superimpose mode for storing a multi-level image signal, erase of the data and selection of the registered image are set according to the message displayed on the display section 84.

Figure 5:
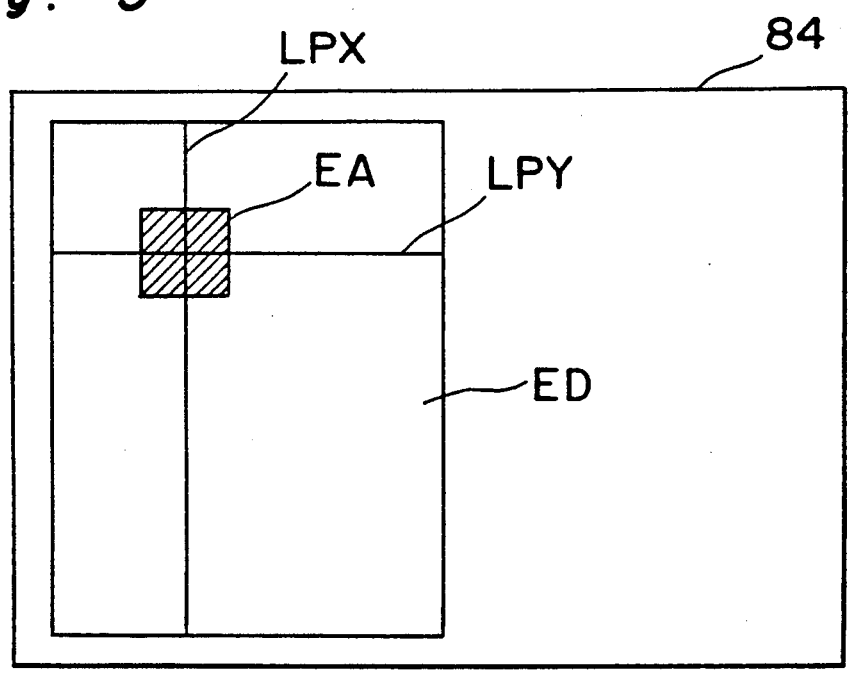
FIG. 5 is a front view of a display section of the operation panel shown in FIG. 4 upon setting a specific area thereon.

In the superimpose mode and the mosaic monitor mode described in detail later, the areas such as a write area, a read area etc. are set as follows. For example, in the case of setting the specific area, as shown in FIG. 5, a document is set on the platen 15, and the preparatory scan is performed by the scanner 10, and then, the image of the document is roughly displayed on the document area ED of the display section 84 of the operation panel 70. As shown in FIG. 5, the intersection between a longitudinal instructing line LPX and a lateral instructing line LPY corresponds to the center of the square write area EA. When the jog dials 82 and 83 are rotated, the instructing lines LPX and LPY are moved in the longitudinal direction and the lateral direction. Therefore, the write area EA is set by rotating the jog dials 82 and 83, and the set key 76 is pushed down, so that the specific area is set.

It is to be noted the size of the write area EA is predetermined to have a constant size.

(2) Superimpose mode

When the function key 79 of the operation panel 70 is pushed down, the superimpose mode is selected. In the superimpose mode, the image data of the above write area (referred to as a registered image data) is stored in the memory, previously, and the registered image data is printed on any position of another image to be copied. In the superimpose mode, the registered image data is stored and read out by using the image memory circuit 1. The setting method of the write area EA of the registered image is described above, referring to FIG. 5. The write area EA has, for example, a size of 2 cm square. The memory capacity of the image memory circuit 1 is equal to that required for storing a multi-level image data.

The CPU 25 can easily calculate the range of the horizontal lines from the edge of the image and the range of the picture elements in the main scan direction where the write area EA is positioned, respectively. The CPU 25 outputs the position data of the write area EA (referred as to a write area setting signal) which are the coordinate $(x_0, y_0)$ of the top left edge thereof and the coordinate $(x_1, y_1)$ of the bottom right edge thereof, to the image memory circuit 1.

When the same document is scanned again, the image memory circuit 1 stores the image data of the write area EA.

Thereafter, another document to be copied is set on the platen 15, and a preparatory scan is performed by the scanner 10. Then, similarly to the case of setting the write area EA, the document image ED and the instructing lines LPX and LPY are displayed on the display section 84 of the operation panel 70. The intersection between the instructing lines LPX and LPY becomes a center of the superimpose area EB where the registered image is printed. The superimpose area is set by rotating the jog dials 82 and 83, and thereafter, a set key 76 is pushed down, and then, the superimpose area EB is set. The CPU 25 outputs the position data of the read area EB (referred as to a read area setting signal) which are the coordinate $(x_0, y_0)$ of the top left edge thereof and the coordinate $(x_1, y_1)$ of the bottom right edge thereof to the image memory circuit 1.

Figure 6C:
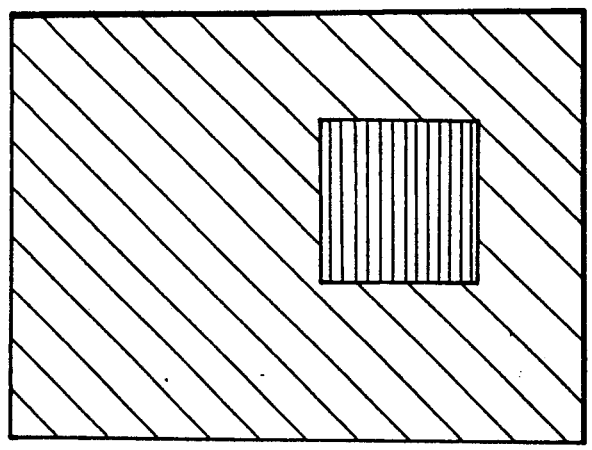
FIG. 6c is a front view of a superimposed image.
Figure 6B:
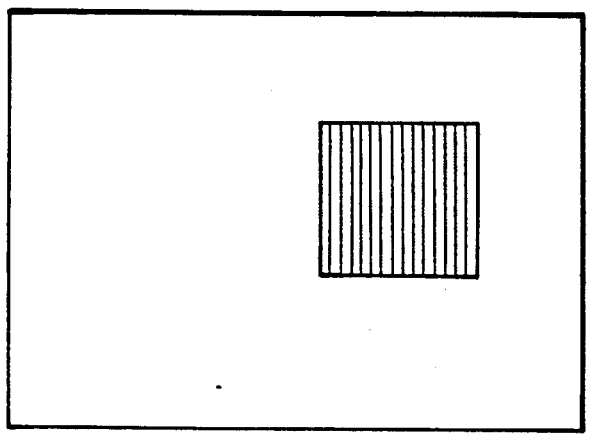
FIG. 6b is a front view of a register image in the superimpose mode.
Figure 6A:
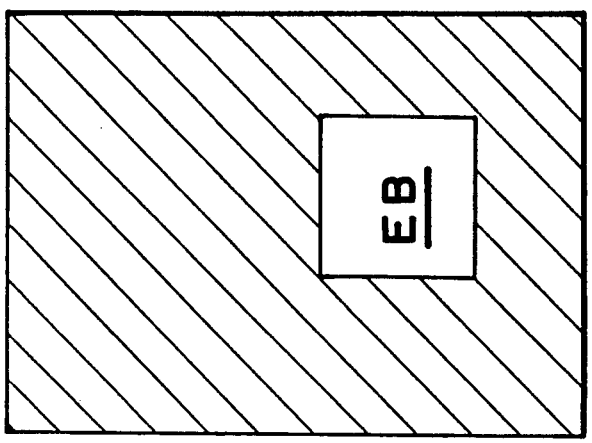
FIG. 6a is a front view of a document image in the superimpose mode.

When the document is scanned again, the image of the document to be copied is printed on a copying paper except for the superimpose area EB (empty area) as shown in FIG. 6a. At that time, white image is printed in the area EB thereof. The above printing process is performed, repeatedly, for maximum four color images. The copying paper is retained on the transfer drum 51. Thereafter, the copying operation is performed, and the image data is read out from the memory, the image data is printed in the superimpose area EB on the same copying paper, as shown in FIG. 6b. At that time, white image is printed in the other area than the area EA. The above printing process is performed, repeatedly, for maximum four color images. Thus, the image stored in the memory is superimposed on the document image, as shown in FIG. 6c.

If the registered image is half tone image such as a picture, the multi-level image signal of red color, green color and blue color outputted from the shading correction circuit 23 is stored in the memory of the image memory circuit 1.

However, if the registered image is a binary image such as a character, a multi-level image signal outputted from the shading correction circuit 23 is converted into a binary data of printing colors Y, M, C and is stored in the memory. Then, even though a memory having the same memory capacity is used, a lot of registered images can be stored in the memory. For example, if the output bit of the shading correction circuit 23 is 8 bits, eight times binary image data is stored in the memory, and the image thereof is superimposed on the document image. Therefore, the operator selectively sets the superimpose mode for storing a binary image signal or the superimpose mode for storing a multi-level image signal.

If the magnification of the document image is the same as that of the registered image, it is not necessary to perform the above printing process, and the document image and the registered image are printed at the same time on a copying paper. (See steps S223 to S228 in FIG. 26)

Also, if the image of the superimpose area of the document is a white image, the superimpose image may be printed on the area of the above white image without inhibiting from printing an image in the superimpose area.

In the above description, the registered image is printed in one superimpose area, however, plural write areas are registered, plural superimpose images can be printed in the plural write areas as described later, referring to FIG. 8.

(3) Mosaic monitor mode

The mosaic monitor processing in the mosaic monitor mode is performed by the image memory circuit 1 for storing the image data of the specific area EA and the color tone setting circuit 2 for performing the color correction in a printing process.

The mosaic monitor mode is selected when the function key 78 of the operation panel 70 is pushed down.

In the mosaic monitor mode, first of all, a specific area EA for which the color adjustment is made (for example, an area indicated by oblique lines in FIG. 5) is set while looking at the image of the document displayed on the display section 84 of the operation panel 70 which has been obtained in the above preparatory scan process. When the specific area EA is set, the image memory circuit 1 stores only image data I corresponding to the set value of the specific area EA in a random access memory 401 (referred to as a RAM hereinafter) shown in FIG. 10. It is to be noted that the upper limit of the size of the specific area EA is predetermined according to the memory capacity of the RAM 401.

Thereafter, the color tone setting circuit 2 performs various kinds of color correction for the image data I which is outputted from the image memory circuit 1 and is converted into the image data of printing color so as to generate printing image data $I' = kI$ ($k = Kc, Km, Ky$), wherein the coefficients $Ky$, $Km$ and $Kc$ are the color adjustment coefficients K for yellow color, magenta color and cyan color, respectively.

Figure 7:
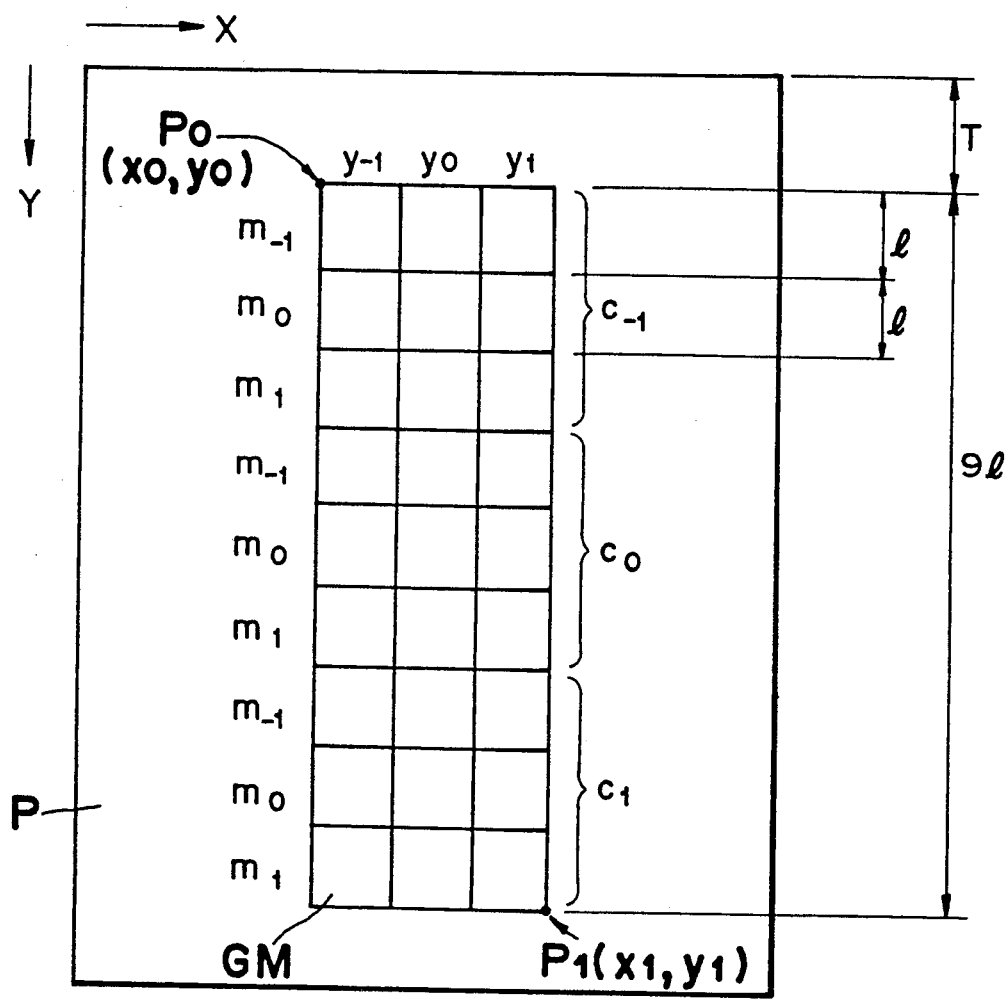
FIG. 7 is a front view of an output format of a mosaic monitor image.

FIG. 7 shows one example of an output format of the printing image data $I'$.

Referring to FIG. 7, three kinds of color adjustment coefficients $Ky = y_i$, $Km = m_i$ and $kc = c_i$ ($i = -1, 0, +1$) are used for three colors of cyan color (c), yellow magenta color (m) and yellow color (y), and then, 27 kinds of images ($3 \times 3 \times 3 = 27$) are outputted. The color adjustment coefficients $c_0$, $m_0$ and $y_0$ represent a standard value for the color adjustment, the color adjustment coefficients $c_1$, $m_1$ and $y_1$ represent a value for the color adjustment which is the product of the standard value and a predetermined factor smaller than one, and the color adjustment coefficients $c_{-1}$, $m_{-1}$ and $y_{-1}$ represent a value for the color adjustment which is the product of the standard value and another predetermined factor larger than one.

The operator selects a suitable color tone from 27 kinds of mosaic monitor image GM shown in FIG. 7, and then, the process of the mosaic monitor mode is completed.

In the mosaic monitor mode, in the case that the operator specifies a desirable color tone from the mosaic monitor image GM, for example, the function keys 78 to 81 are operated according to the message displayed on the display section 84 of the operation panel 70 so as to select one image from the mosaic image GM, and then, the color adjustment for processing the selected image is specified. Otherwise, after the image block shown in FIG. 7 is displayed on the display section 84, the function keys 78 to 81 and the ten key 75 may be operated so as to select one of the mosaic image GM, and then, a desirable color adjustment may be selected.

Next, the image of the document is read out again by the reading section 100, and then, the image having the set color tone is printed by the printer section 200.

In both the superimpose mode and mosaic monitor mode, the memory for registering the image is required, and also the circuit related to the reading out and writing the image data in the memory is used commonly. Therefore, in the present embodiment, the image memory circuit 1 is used commonly in both the modes.

(4) Image memory circuit 1

(4-1) Composition of image memory circuit

The image memory circuit 1 is used for storing the registered image of the specific area EA of the document in the superimpose mode and mosaic monitor mode, and also reading out the registered image in the superimpose area EB which is any specific position of a copying paper in the superimpose mode and at the output format as shown in FIG. 7 in the mosaic monitor mode.

Figure 8A:
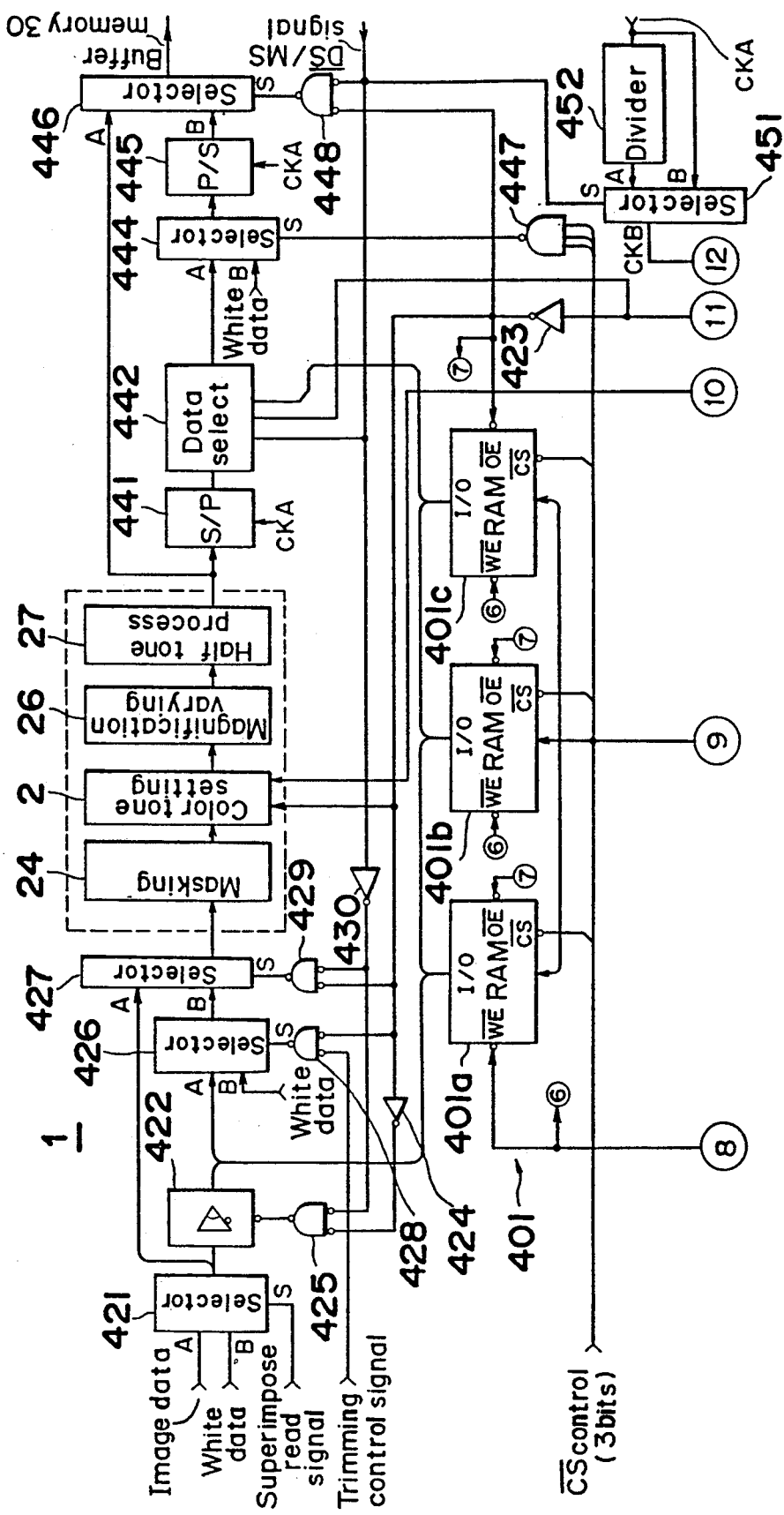
FIGS. 8a and 8b are a block diagram of an image memory circuit.
Figure 8B:
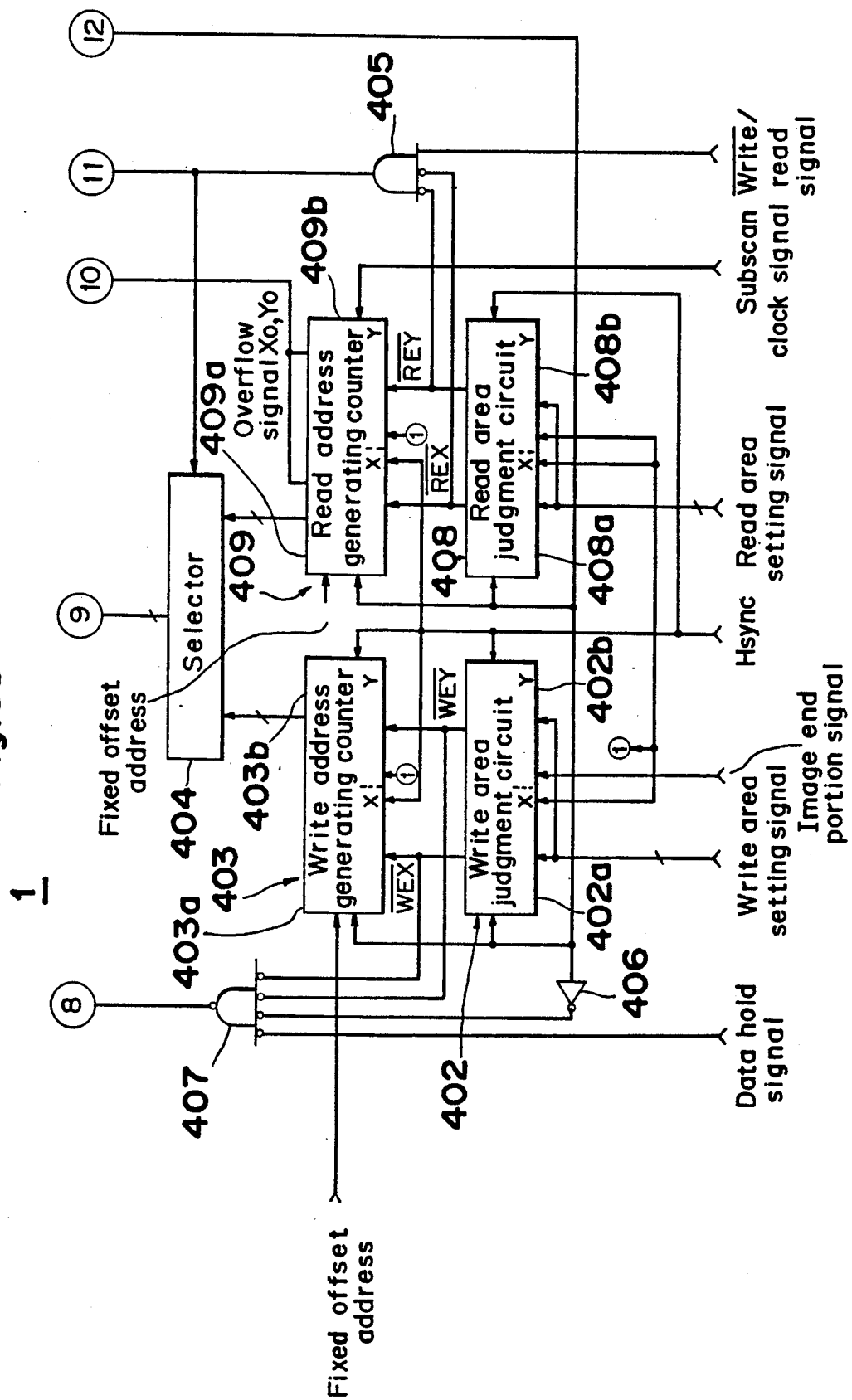

FIGS. 8a and 8b are block diagrams of the image memory circuit 1. Referring to FIG. 8a, memories 401a, 401b and 401c (referred to as a memory 401 wholly) are RAMs for storing the register images. Addresses of respective memories 401a, 401b and 401c are used commonly, and also a timing for writing and reading out the image data is used for respective memories 401a, 401b and 401c. Respective memories 401a, 401b and 401c are selected by a chip control signal $\overline{CS}$.

In the mode for storing the binary image signal as described in detail later, it is necessary to write the image data corresponding to the printing color therein. Therefore, the CPU 25 selects the memory into which the image data is written according to the chip select control signal $\overline{CS}$ which the CPU 25 outputs. In the mode for storing the multi-level image signal, the CPU 25 outputs the chip select control signal $\overline{CS} = $ "000".

The image memory circuit 1 is used in both the superimpose mode and the mosaic monitor mode. In the superimpose mode, there are the mode for storing the multi-level color image signal, the mode for storing the binary color image signal, and the mode for storing the binary mono-color image signal. In those cases, the access method is altered for respective memories 401a, 401b and 401c.

Not only the data which is outputted from the shading correction circuit 23 and is input into the memory 401, but also the data which is outputted from the memory 401 and is input into the masking process circuit 24 are processed by various selectors 421, 426, 427, 444 and 446, three-state buffer amplifier 422, and the data selecting circuit 442. When the reading-out signal is input into the selector 421 in the superimpose mode, the selector 421 selects white data. In the other cases, the selector 421 selects the image data outputted from the shading correction circuit 23. The output signal of the selector 421 is sent to the buffer amplifier 422 and the selector 427. When the output of an AND gate 425 becomes a Low level, the buffer amplifier 422 is enabled, and then the buffer amplifier 422 sends the output signal of the selector 421 to the I/O terminal of the memory 401. A binary storing/multi-level storing signal ($\overline{DS}$/MS) is input to one input terminal of the AND gate 425 through an inverter 430, and the output signal of the AND gate 405 is input to another input terminal of the AND gate 425 through inverters 423 and 424. Therefore, in the mode for storing the binary image signal and when the image data of the read area is read out, the output terminal of the buffer amplifier 422 becomes a high impedance state. On the other hand, in the mode for storing the multi-level image signal, the buffer amplifier 422 sends the image data to the selector 426 of the next stage thereof. In this case, the memory 401 is positioned at the next step of the shading correction circuit 23. In the mode for storing the multi-level image signal and when the image data is read out from the memory 401, the output terminal of the buffer amplifier 422 becomes a high impedance state. On the other hand, in the mode for storing the binary image signal, the output terminal of the buffer amplifier 422 becomes a high impedance state, the image data is sent to the masking process circuit 24 through the selector 427, and thereafter, the image data is binarized by the half tone processing circuit 27, and is stored in the memory 401.

The output data of the memory 401 is input to the input terminal A of the selector 426, and white data is input to the input terminal B of the selector 426. A select signal is input to the selector 426 through an AND gate 428, and the selector 426 sends the selected signal to the input terminal B of the selector 427. The output signal of the AND gate 405 is input to the input terminal of the AND gate 428 through the inverter 423. When a low level signal is input to the input terminal of the AND gate 428 through the inverter 423 (when the image signal of the read area is read out) and a low level trimming control signal is input to another input terminal of the AND gate 428, the AND gate 428 outputs a low level select signal to the selector 426, and then, the selector 426 outputs white data to the input terminal B of the selector 427. Therefore, in the mode for storing the multi-level image signal and when the image data of the read area is read out, generally, the selector 426 selects the image data which is read out from the memory 401 and is input to the input terminal A thereof, on the other hand, when the trimming control signal becomes a low level, the selector 426 selects white data which is input to the input terminal B thereof.

The output signal of the selector 421 is input to the input terminal A of the selector 427, and the output signal of the selector 426 is input to the input terminal B of the selector 427. The output signal of an AND gate 429 is input to the selector 427 as a select signal. The selector 427 outputs the selected signal to the masking process circuit 24. The binary storing/multi-level storing signal is input to one input terminal of the AND gate 429 through the inverter 430, and the output signal of the AND gate 405 is input to another terminal of the AND gate 429. Therefore, in the mode for storing the multi-level image signal and when the image data of the read area is read out, the selector 427 outputs the image data which is input to the input terminal B thereof to the masking process circuit 24. On the other hand, for example, in the mode for storing the binary image signal, the selector 427 outputs the image data which is input from the selector 421 to the masking process circuit 24.

The output signal of the half tone processing circuit 27 is input to the input terminal A of the selector 446, and the output signal of the parallel/serial converter (referred to as a P/S converter hereinafter) 445 is input to the input terminal B of the selector 446. The output signal of the AND gate 448 is input to the selector 446 as a select signal. The selector 446 outputs the selected signal to the buffer memory 30.

The binary storing/multi-level storing signal is input to one input terminal of the AND gate 448, and the output signal of the AND gate 405 is input to another input terminal of the AND gate 448 through an inverter 423. In the mode for storing the binary image signal and when the image signal of the read area is read out, the selector 446 outputs the output signal of the P/S converter 445 to the buffer memory 30. In the other cases, for example, in the mode for storing the multi-level image signal, the selector 446 outputs the output signal of the half tone processing circuit 27 to the buffer memory 30.

A serial/parallel converter (referred to as an S/P converter hereinafter) 441, a data selecting circuit 442, a selector 444 and a P/S converter 445 are used in the mode for storing the binary image signal.

Figure 9:
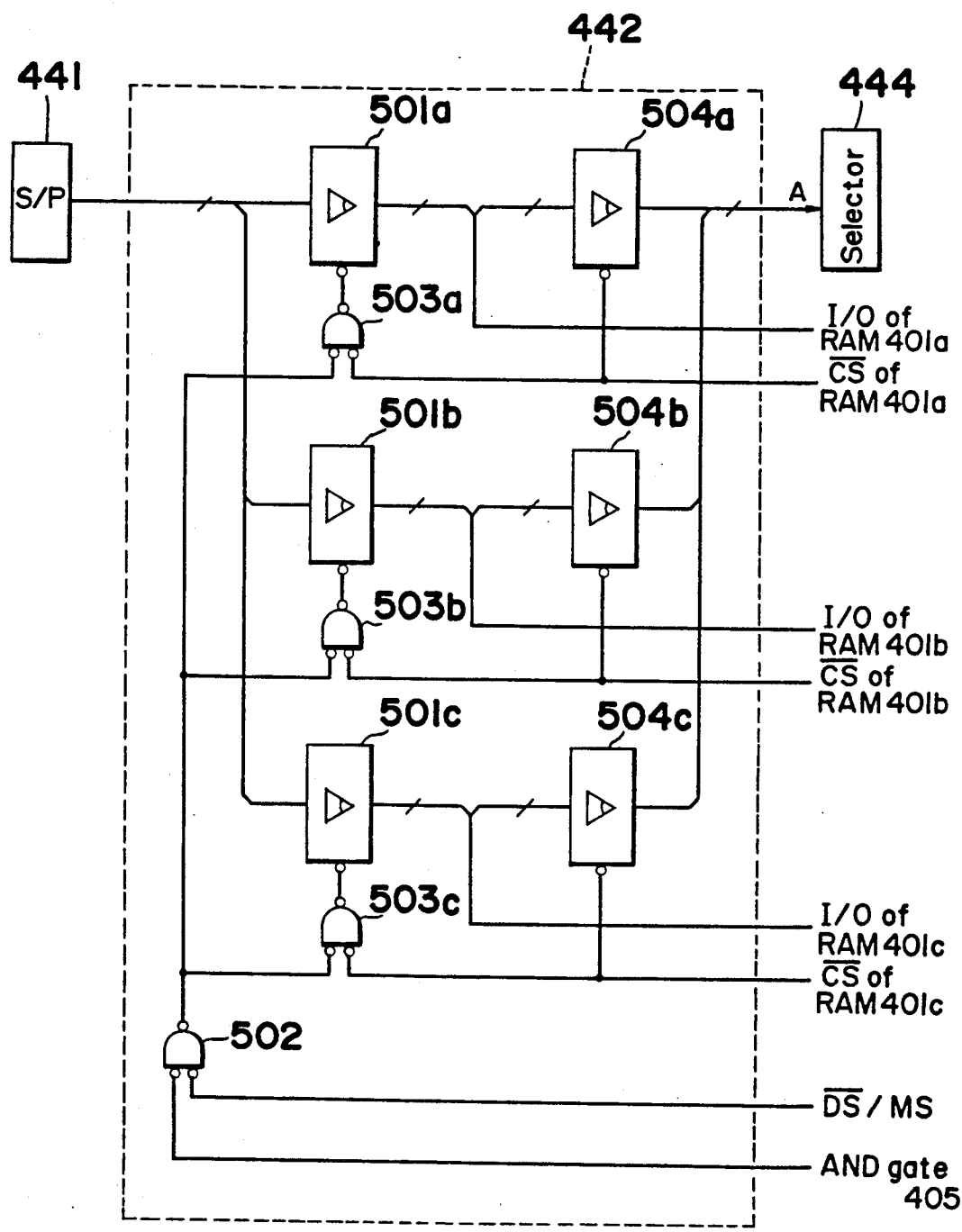
FIG. 9 is a block diagram of a data selecting circuit.

The data selecting circuit 442 is comprised of three-state buffer amplifiers 501a, 501b, 501c, 504a, 504b and 504, and AND gates 502, 503a, 503b and 503c, as shown in FIG. 9. In FIG. 9, when the output signals of the AND gates 503a, 503b and 503c become a Low level, the three-state buffer amplifier 501a, 501b and 501c are enabled, and then, the output signal of the S/P converter 441 is sent to the memory 401.

The binary storing/multi-level signal is input to one input terminal of the AND gate 502, and the output signal of the AND gate 405 is input to another input terminal of the AND gate 502. The output signal of the AND gate 502 is input to respective one input terminals of the AND gates 503a, 503b and 503c. Therefore, in the mode for storing the multi-level image signal or when the image signal of out of the read area is read out, respective output terminals of the buffer amplifiers 501a, 501b and 501c become high impedance states. Namely, only in the mode for storing the binary image signal and when the image data is written in the memory 401, the three-state buffer amplifiers 501a, 501b and 501c are enabled. The chip select control signal $\overline{CS}$ is input to the three-state buffer amplifiers 504a, 504b and 504c. When the chip select control signal $\overline{CS}$ is a low level ("0"), the three-state buffer amplifiers 504a, 504b and 504c sends the image data outputted from the memory 401 to the selector 444.

The selector 444 selects the output signal of the memory 401 which is input to the input terminal A thereof, or white data which is input to the input terminal B thereof. In accordance with the chip select control signal $\overline{CS}$, the AND gate 447 outputs a select signal to the selector 444. Therefore, for example, in the mode for storing the binary mono-color image signal and when the chip select control signal $\overline{CS}$ becomes "111", namely when all the memories 401a, 401b and 401c are not selected, the selector 444 outputs white data to the P/S converter 445, in the other cases, the selector 444 outputs the output signal of the memory 401 to the P/S converter 445.

The S/P converter 441 converts the signal which is binarized by the half tone processing circuit 27 in the mode for storing the binary image signal into the image data having a predetermined bit number for storing the memory 401 so as to output the image data to the data selecting circuit 442.

The P/S converter 445 converts the parallel image data which is read out from the memory 401 through the selector 444 when the image data is read out in the mode for storing the binary image signal, into the serial data so as to output the serial data to the selector 446.

When the image data is stored and read out in the mode for storing the binary image signal, it is necessary to perform the S/P conversion and the P/S conversion, respectively, and therefore, another clock signal is required. Namely, the binarized signal is processed in synchronous with the clock signal CKA in the S/P converter 441 and the P/S converter 445, however, the parallel image data is not processed in synchronism with the above clock signal CKA. Therefore, the clock signal CKA is divided into the signal CKB having the bit number of the parallel image signal by a divider 452 so as to be outputted to the input terminal A of the selector 451.

The selector 451 selects the clock signal CKA or the divided signal CKB in order to transfer the image data and manage the address for the memory 401.

Figure 10:
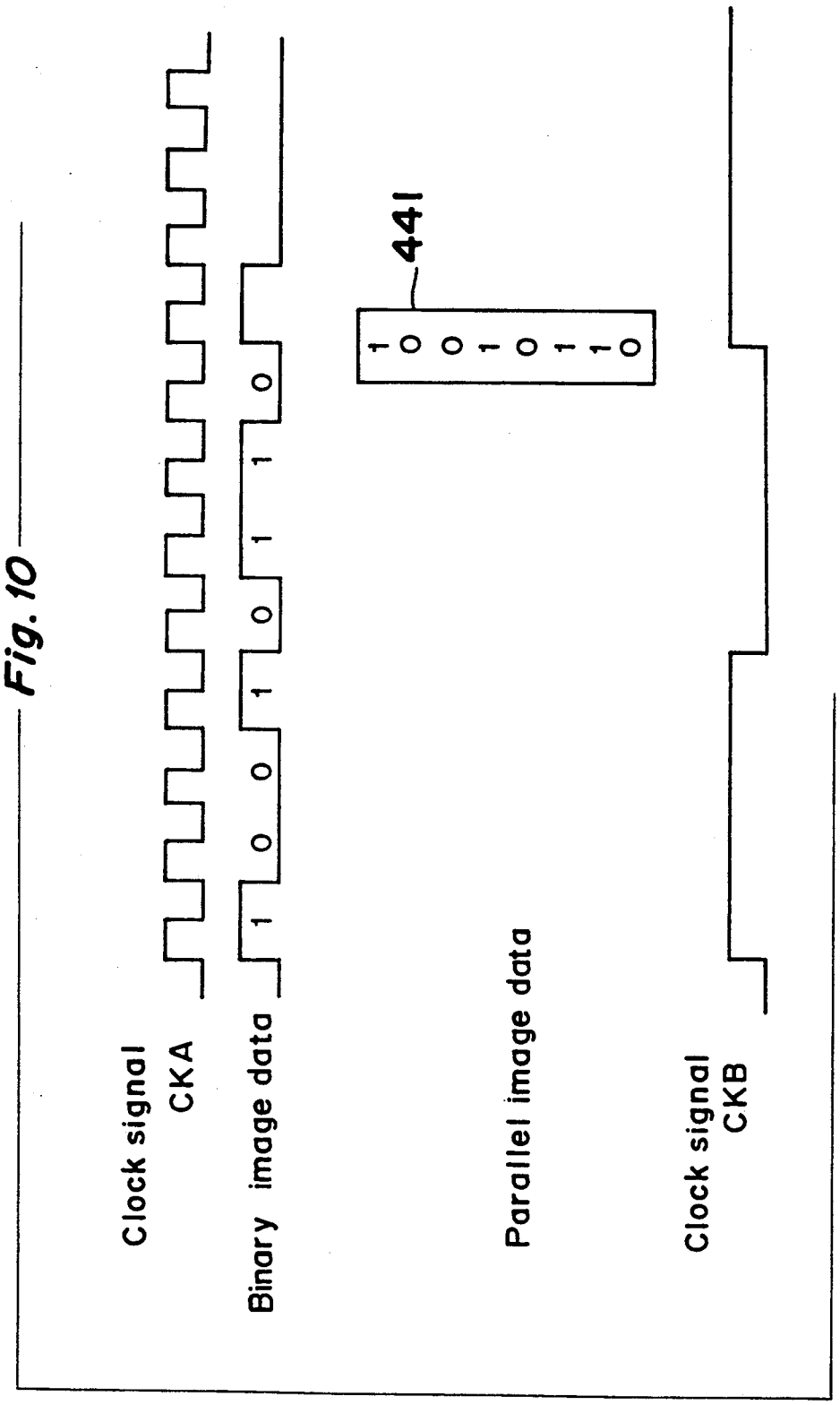
FIG. 10 is a timing chart of a serial/parallel conversion of image data.

FIG. 10 is a timing chart of the clock signals CKA and CKB, the binarized signal, and the parallel image data in the case that the bit number of the multi-level signal is eight. In the superimpose mode for storing the multi-level image signal or in the mosaic monitor mode, the image data of the memory 401 is processed in synchronous with the clock signal CKA. Therefore, the selector 451 selects the clock signal CKA or the divided clock signal CKB according to the binary storing/multi-level storing signal. In the mode for storing the multi-level image signal, the selector 451 selects the clock signal CKA as the signal CKB, namely CKA=CKB.

Then, the storing and reading processing of the image data in the memory 401 will be described below. The composition of the write area judgment circuit 402, the write address generating counter 403, the read area judgment circuit 408 and the read address generating counter 409 will be described in detail later, referring to FIG. 12.

When the document is scanned and the write area judgment circuit 402 receives the image end portion signal, the write area judgment circuit 402 counts the clock signal CKB and the horizontal synchronizing signal Hsync. Thereafter, when the write area judgment circuit 402 judges that the scanning point is within the write area in the main scan direction X and the subscan direction Y in accordance with the write area setting signal which is input from the CPU 25, the write area judgment circuit 402 outputs the judgment signal $\overline{WEX}$ and $\overline{WEY}$ to the AND gate 407 and the write address generating counter 403. When the image data is held in the memory 401, a High level data hold signal is input from the CPU 25 to one input terminal of the AND gate 407, and the clock signal $\overline{CKB}$ is input to another input terminal of the AND gate 407 through the inverter 406. Therefore, when the data hold signal becomes a low level and the scanning point of the document is within the write area (namely, $\overline{WEX}=\overline{WEY}=$"Low"), the AND gate 407 outputs the clock signal $\overline{CKB}$ ($\overline{CKA}$ in the mode for storing the multi-level image signal) to the write enable terminal $\overline{WE}$ of the memory 401 so as to allow the memory 401 to be written in. On the other hand, when the image data is written in the memory and the scanning point is within the write area in the main scan direction, the write address generating counter 403 counts the clock signal CKB. On the other hand, when the scanning point is within the write area in the subscan direction, the write address generating counter 403 counts the horizontal synchronizing signal Hsync. Then, the write address generating counter 403 counts the X-coordinate and the Y-coordinate in the write area, and calculates the write address of one dimension from the X and Y-coordinates. Furthermore, the write address generating counter 403 adds a fixed offset address to the calculated write address. The write address obtained thus is outputted to the memories 401a, 401b and 401c through the selector 404.

The read area in the main scan direction and in the subscan direction according to the read area setting signal which is outputted from the CPU 25

The read area judgment circuit 408 judges whether or not the scanning point of the document is within the read area in the main scan direction and in the subscan direction according to the read area setting signal which is outputted from the CPU 25. When it is within the read area, the read area judgment circuit 408 outputs the judgment signals $\overline{REX}$ and $\overline{REY}$ to one input terminal of the AND gate 405 and the read address generating counter 409. Furthermore, the write/read signal which is outputted from the CPU 25 is input to another input terminal of the AND gate 405. Therefore, when the image data is read out and the scanning point is within the read area, the AND gate 405 outputs a High level signal to the selector 404 and also a Low level signal to the output enable terminal $\overline{OE}$ of the memory 401 through the inverter 423. Then, the image data can be read out from the memory 401. Furthermore, the read address generating counter 409 generates and outputs the read address of one dimension as well as the write address generating counter 403, to the memory 401 through the selector 404. When the output signal of the AND gate 405 becomes a High level, the selector 404 outputs the read address from the read address generating counter 409 to the address terminal of the memory 401. On the other hand, when the output signal of the AND gate 405 becomes a Low level, the selector 404 outputs the write address from the write address generating counter 403 to the address terminal of the memory 401. The read address generating counter 409 allows the magnification to vary in the subscan direction by using the subscan clock signal. Furthermore, in order to alter the color adjustment in the mosaic monitor mode, the read address generating counter 409 generates and outputs the overflow signals $X_0$ and $Y_0$ to the color tone setting circuit 2.

The superimpose read signal becomes a Low level when the image data is read out in the superimpose mode and in the mosaic monitor mode, and is used for making the selector 421 select white data. Furthermore, the trimming control signal becomes a low level when white image is printed in the read area of a copying paper, and then, the selector 426 selects white data so as to output it to the selector 427.

(4-2) Superimpose mode for storing the multi-level image signal

In order to enable the superimpose function, the memory may be arranged after the image data is process by the half tone processing circuit 27. In this case, since the image data is converted into the binary printing signal, the color adjustment cannot be made for the binary signal. Particularly, in the case the registered image is a color image, it is necessary to often make the color adjustment, however, color adjustment cannot be made. Furthermore, when the magnification is varied after the image data is binarized, the quality of image is lowered considerably. Therefore, in the present preferred embodiment, when the binary storing/multi-level storing signal is made a High level and the $\overline{\text{write}}$/read signal is made a Low level, the buffer amplifier 422 is enabled and the output terminal of the buffer amplifiers 501a, 501b and 501c become high impedance state, and then, the memory 401 is positioned at the previous step of the half tone processing circuit 27, and the multi-level data of red color, green color and blue color can be stored in the memory 401. The color adjustment in the superimpose mode will be described later relating to the color tone setting circuit 2. In this case, the superimpose mode read signal becomes a low level, the selector 421 selects the image data, and the chip select control signal $\overline{\text{CS}}$ is "000".

In the case that the register image is stored in the memory 401, when the operator specifies the write area, the CPU 25 calculates which range of the lines in the subscan direction Y from the end portion of the image the write area is positioned, and also calculates which range of picture elements in the main scan direction X the write area is positioned. Then, the CPU 25 outputs the coordinates of the top left edge and the bottom right edge of the write area as the write area setting signal in the main scan direction X and the subscan direction Y to the X section 402a and the Y section 402b of the write area judgment circuit 402 (as described later, See FIG. 12).

After the X section 402a and the Y section 402b of the write area judgment circuit 402 receive the image end portion signal, they count the horizontal synchronizing signal Hsync and the clock signal CKB, and also judges whether or not the counting values are within the setting range of the write area. When the counting value is within the write area in the main scan direction X, the X section 402a outputs the signal $\overline{\text{WEX}}$="Low". When the counting value is within the write area in the subscan direction Y, the Y section 402b outputs the signal $\overline{\text{WEY}}$="Low".

When the write area judgment circuit 402 judges that the counting values are within the write area, the write address generating counter (See FIG. 12) 403 generates and outputs the write address to the address terminals of the memories 401a, 401b and 401c through the selector 404. Namely, when $\overline{\text{WEX}}$="Low", the X section 403a of the write address generating counter 403 counts the clock signal CKB and generates the address in the main scan direction. The address is cleared by the horizontal synchronizing signal Hsync.

When $\overline{\text{WEY}}$="Low", the Y section 403b of the write address generating counter 403 counts the horizontal synchronizing signal Hsync and generates the address in the subscan direction. The address is cleared by the image end portion signal which is outputted from the CPU 25. The write address generating counter 403 generates the write address of one dimension in accordance with both the addresses in the main scan direction and in the subscan direction and a fixed offset address.

In the case that the write address is generated thus and the image data is stored in the memories 401a, 401b and 401c, the data hold signal becomes a Low level, and the $\overline{\text{write}}$/read signal becomes a Low level. Then, since the AND gate 405 outputs a select signal to the selector 404, the selector 404 outputs the address signal from the write address generating counter 403 to the address terminals of the memories 401a, 401b and 401c. On the other hand, the clock signal CKB is input to the write enable terminals $\overline{\text{WE}}$ of the memories 401a, 401b and 401c through the inverter 406 and the AND gate 407, and then, the image data is stored in the memories 401a, 401b and 401c. On the other hand, in the superimpose mode or except that the image data is read out in the mosaic monitor mode, since the superimpose read signal from the CPU 25 becomes a Low signal, the selector 421 outputs the image data. Furthermore, since the $\overline{\text{write}}$/read signal becomes a Low level, in the mode for storing a multi-level image signal (the binary storing-/multi-level signal becomes a high level), the three-state buffer amplifier 422 is enabled only on the condition that it is permitted that the document is read, and then, the image data is sent to the I/O terminals of the memories 401a, 401b and 401c. As described above, only the image of the area which is judged in the write area in the main scan direction and in the subscan direction by the write area judgment circuit 402 can be stored in the memory 401. When storing of the image data is completed, the CPU 25 outputs a High level data hold signal to the AND gate 407, and then, storing of the image data is inhibited so that the image data is held in the memory 401.

In the case that the image data stored in the memory 401 is read out, it is necessary for the image data to read out so as to be printed on the specific read area or the superimpose area. The composition of the circuit for reading out the image data is substantially same as that of the circuit for storing the image data in the memory 401. When the image data is read out, the chip select control signal $\overline{\text{CS}}$ is "000".

The CPU 25 outputs the X and Y-coordinate setting value which can be judged that the scanning point is within the read area in the main scan direction and in the subscan direction to the X section 408a and the Y section 408b of the read area judgment circuit 408 for judging the read area on a copying paper. When the document is scanned and the read area judgment circuit 408 receives the image end portion signal, the circuit 408 counts the horizontal synchronizing signal Hsync and the clock signal CKB, and also judges whether or not the counting values are within the setting range of the read area. When the counting values are within the above range in the main scan direction, the X section 408a outputs a signal $\overline{\text{REX}}$="Low". When the counting values are within the above range in the subscan direction, the Y section 408b outputs a signal $\overline{REY}$="Low".

When the read area judgment circuit 408 judges that the counting values are within the read area, the read address generating counter 409 generates and outputs the read address to the address terminal of the memories 401a, 401b and 401c through the selector 404 since the write/read signal becomes a "High" level in the case that the image data is read out. Namely, when $\overline{REX}$="Low", the X section 409a of the read address generating counter 409 counts the clock signal CKB and generates the read address in the main scan direction. The read address is cleared by the horizontal synchronizing signal Hsync. Furthermore, when $\overline{REY}$="Low", the Y section 409b of the read address generating counter 409 counts the subscan clock signal which is outputted from the subscan clock generator 29 shown in FIG. 2 and generates the address in the subscan direction. Then, the horizontal synchronizing signal Hsync is not counted, the subscan clock signal is counted in order to vary the magnification in the subscan direction. The above address is cleared by the image end portion signal which the CPU 25 outputs. The read address of one dimension is generated from both the above address and a fixed offset address. It is noted that the image data which is read out from the memory 401 is sent to the buffer memory 30.

Figure 20:
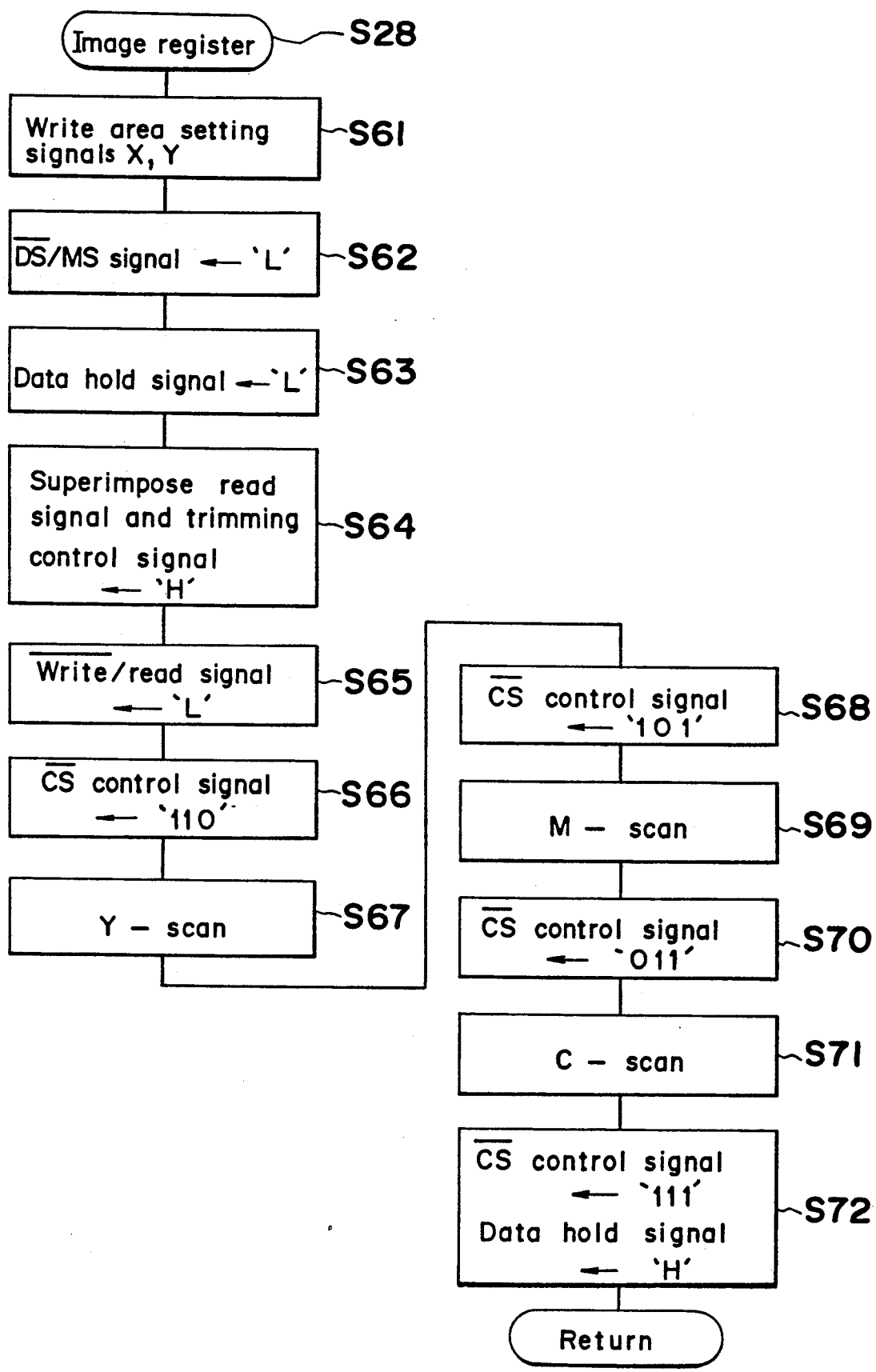
FIG. 20 is a flow chart of an image register processing in the superimpose mode for storing the binary color image signal.
Figure 23:
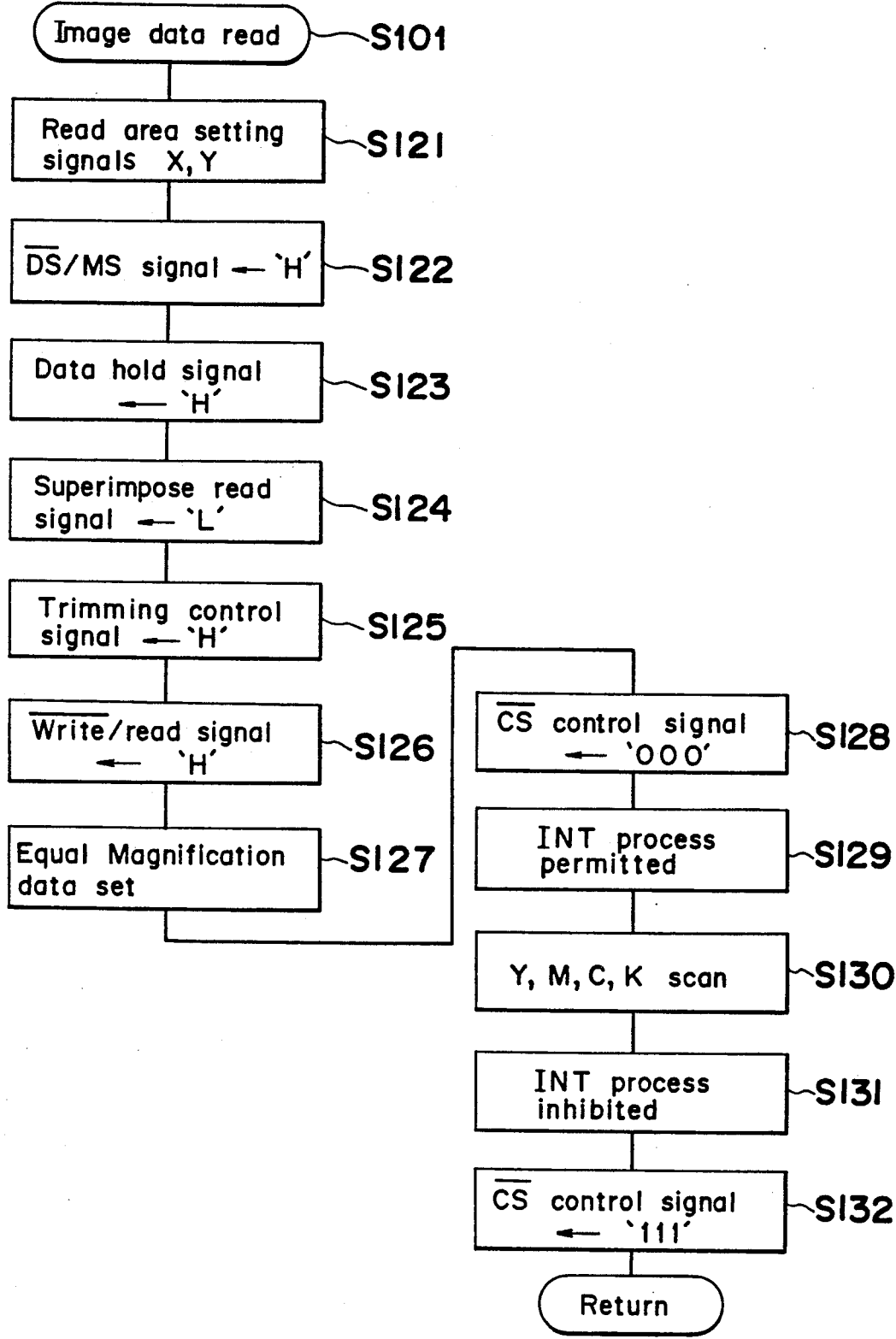
FIG. 23 is a flow chart of reading out processing of the image data stored in the memory.

FIGS. 20 and 23 are flow charts of storing and reading out of the image data in the above mode.

(4-3) Magnification varying

It is possible to vary the magnification in the superimpose mode for storing the multi-level image signal. The magnification of the superimpose image may be varied corresponding to the magnification when the document is read out, on the other hand, the magnification of the superimpose image may not be varied when the document is read out at the same magnification. The frequency of the subscan clock signal outputted from the subscan clock generator 29 can be controlled by the CPU 25, so that both the two cases can be performed (See FIG. 26). Namely, in order to vary the magnification of the superimpose image, the subscan clock signal is supplied to the read address generating counter 409. In order to vary the magnification of the document image, the subscan clock signal is supplied to the magnification varying circuit 26. In the present preferred embodiment, when the magnification of the superimpose image is the same as that of the document image, both the images can be printed on a copying paper simultaneously.

(4-4) Storing and reading processing of the image data in the mosaic monitor mode The multi-level image data of the specific area is stored in the memory in the mosaic monitor mode, as well as that of the superimpose mode described above. In this case, the CPU 25 calculates and outputs the write area setting signal from the coordinates of the specific area.

On the other hand, when the mosaic monitor image is printed in the mosaic monitor mode, it is necessary for the image data to be read out so as to be printed at an output format shown in FIG. 7 based on the image data stored in the memories 401a, 401b and 401c. In this case, in order to print white image data on a copying paper in the other cases than the case that the mosaic monitor image is read out, the superimpose read signal is made a "High" level, and then, the selector 421 selects "white" image data. On the other hand, when the image data of the read area stored in the memory 401 is read out, the selector 426 selects the image data since the trimming control signal becomes a "High" level, and therefore, the "white" data is not sent to the next step. The coordinates which is taken the difference between the reading magnification MAGA of the document image and the printing magnification MAGB of the image data stored in the memory 401 are set in the X section 408a and the Y section 408b of the read area judgment circuit 408. It is to be noted that the frequency of the subscan clock signal corresponds to the reading magnification MAGA of the document image.

In the case that the mosaic monitor image comprised of $3 \times 9$ blocks is printed on a copying paper as shown in FIG. 7, the image data is read out from the memory 401 as follows. After the image data of the same horizontal line is read out in the main scan direction three times in accordance with the overflow signal $X_0$ and the image data of the whole content is read out in the subscan direction, the image data of the head line starts to be read out in the main scan direction.

When the image data is read out, the write/read signal becomes a "High" level, and then, the selector 404 outputs the read address to the address terminal of the memory 401, the image data stored in the memories 401a, 401b and 401c can be read out in the read area. The output terminal of the buffer amplifier 422 becomes a high impedance state. The CPU 25 sets a setting value which can be judged that the counting value x is in the range of $x_0 \leq x \leq x_1$ corresponding to the output format shown in FIG. 7 in the X section 408a of the read area judgment circuit 408. The CPU 25 sets a setting value which can be judged that the counting value y is in the range of $y_0 \leq y \leq y_1$ corresponding to the output format shown in 7 in the Y section 408b of the read area judgment circuit 408 When the output signals $\overline{REX}$ and $\overline{REY}$ of the X section 408a and the Y section 408b of the read area judgment circuit 408 become a "Low" level, the X and Y sections 409a and 409b of the read address generating counter 409 generates the read address, and then, the memories 401a, 401b and 401c of the read address are accessed, and the image data stored in the read address is sent to the masking process circuit 24 of the next step through the selectors 426 and 427. Then, the read address generating counter 409, of course, counts the read address in the read area even though the scanning point passes through one block in the main scan direction and also the coordinate of the maximum size, however, after the counter 409 outputs the overflow signals $X_0$ and $Y_0$ to the color tone setting circuit 2, the counter 409 starts to count from an initial value again for the next block. The overflow signals $X_0$ and $Y_0$ are used for printing the mosaic monitor image comprised of plural images having different color tones. Since the color adjustment coefficients ky, km and kc corresponding to the overflow signals $X_0$ and $Y_0$ are set in the color tone setting circuit 2 by the CPU 25, respective images of the mosaic monitor image are printed so as to have different color tones. Thus, three images are printed in the horizontal direction, and the above process is performed nine times, resulting in that the mosaic monitor image of $3 \times 9$ blocks is printed.

(4-5) Superimpose mode for storing the binary color image signal

In this mode, a lot of image data is stored and read out from the memories 401a, 401b and 401c. In the present preferred embodiment, the binary storing/multi-level storing signal is made a "Low" level, and then, the memories 401a, 401b and 401c are inserted at the next step of the half tone processing circuit 27. Namely, the binarized image data is stored in the memory 401. Then, for example, if the bit number of the multi-level signal is eight, eight times binary image data can be stored in the memory 401.

When the binary image data is stored in the memory 401, the binary storing/multi-level storing signal is made a "Low" level, and the $\overline{\text{write}}$/read signal is made a "Low" level, and then, the output terminal of the buffer amplifier 422 becomes high impedance state, and the buffer amplifiers 501a, 501b and 501c of the data selecting circuit 442 are enabled. The memory 401 is separated from the previous step of the masking process circuit 24. On the other hand, the selector 427 selects the data which is input to the input terminal A thereof.

Since the superimpose read signal becomes a "High" level, the selector 421 selects the image data. Thereafter, the image data is sent to the masking process circuit 24 through the selectors 421 and 427, and is binarized by the circuits 24, 2, 26 and 27. The binarized signal which is outputted from the circuit 27 is S/P converted by the S/P converter 441, and parallel data is sent to the memory 401 through the three-state buffer amplifiers 501a, 501b and 501c of the data selecting circuit 442. Furthermore, when the image data stored in the memory 401 is read out, the read image data is converted into 1 bit data again by the P/S converter 445. In this mode, the frequency of the subscan clock is set in the equal magnification mode.

The write area judgment circuit 402 and the write address generating counter 403 operates similarly to the mode for storing the multi-level image signal except for that the clock signal CKA is divided. Therefore, the description of the action of the circuits 402 and 403 are omitted.

When the image data of the read area is read out, the output terminals of the three-state buffer amplifier 422 and the three-state buffer amplifiers 501a, 501b and 501c of the data selecting circuit 442 become high impedance state, the image data stored in the memory 401 is sent to the buffer memory 30 through the three-state buffer amplifiers 504a, 504b of 504c of the data selecting circuit 442 which is enabled by the chip select control signal $\overline{\text{CS}}$, the selector 444, the P/S converter 445 and the selector 446. On the other hand, except for the read area, "white data" which passes through the selectors 421 and 427 is sent to the buffer memory 30 through the selector 446.

In the digital color copying machine, respective color images are superimposed so as to be printed on a copying paper in the order of yellow color, magenta color, cyan color and black color. Therefore, the signal outputted from the half tone processing circuit 27 is one of printing signals of yellow color, magenta color, cyan color and black color. In this mode, in order to store a color image, the document has to be scanned plural times as well as the printing process.

In the present preferred embodiment, the image data of yellow color, magenta color and cyan color are stored in the respective memories 401a, 401b and 401c in order to store a lot of image data in the memory 401. In the superimpose mode, practically, when the image of yellow color is printed, the image data stored in the memory 401a has to be read out. Therefore, the memory to be read out is specified by the chip select control signal $\overline{\text{CS}}$ which the CPU 25 outputs. Concretely, when the image of yellow color is printed, the CPU 25 outputs the chip select control signal $\overline{\text{CS}}$ for selecting the memory 401a. When the image of magenta color is printed, the CPU 25 outputs the chip select control signal $\overline{\text{CS}}$ for selecting the memory 401b. When the image of cyan color is printed, the CPU 25 outputs the chip select control signal $\overline{\text{CS}}$ for selecting the memory 401c (See FIG. 27).

In the case that plural images are stored in the memory 401, the fixed offset address is set so that the selected image is read out. (See step S205 in FIG. 25)

When it is not to necessary to vary the magnification and make the color adjustment after the image data is stored in the memory 401, the mode for storing the binary image signal may be selected, automatically.

Figure 27:
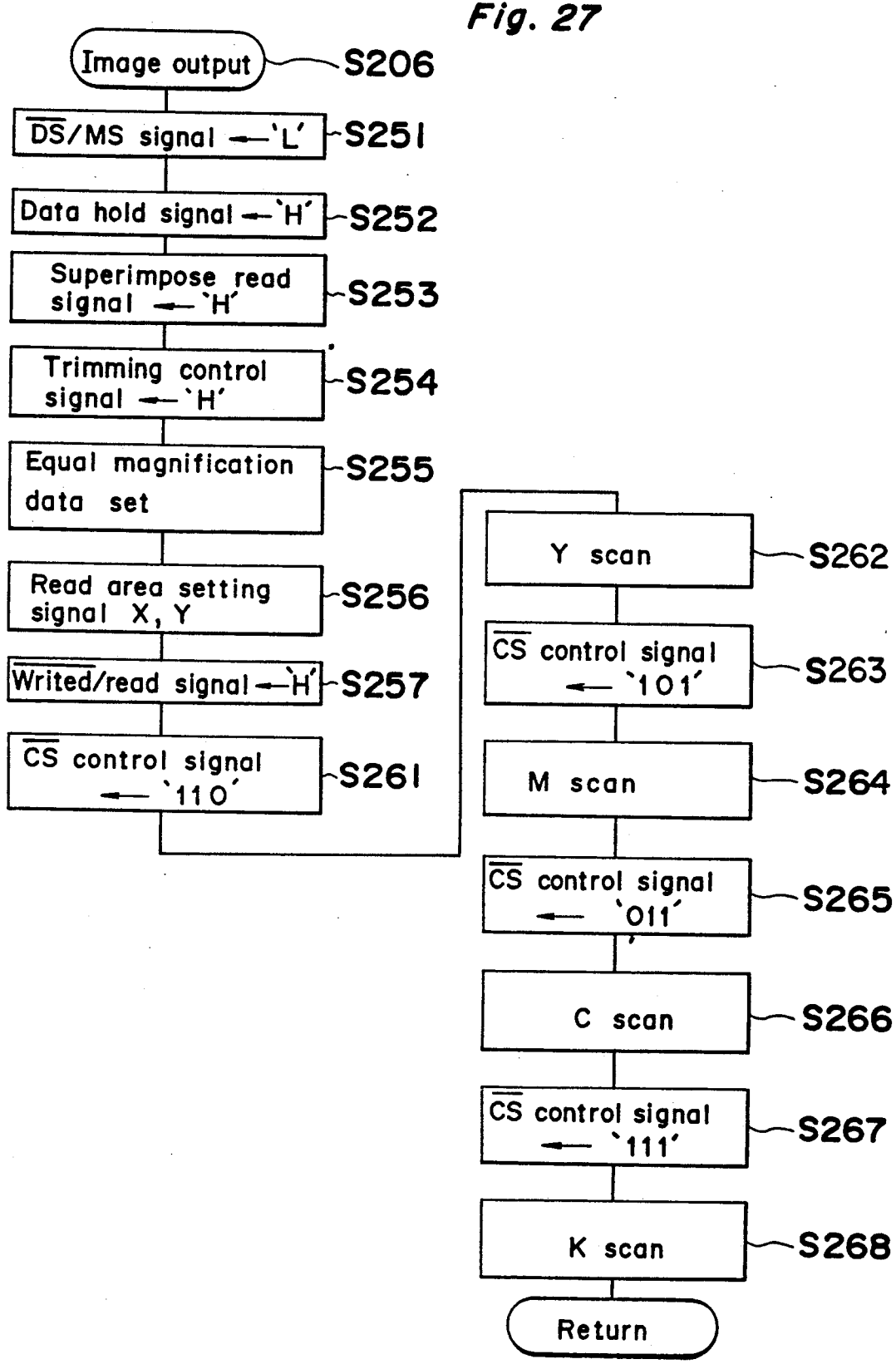
FIG. 27 is a flow chart of an image output processing in the superimpose mode for storing the binary color image signal.

FIGS. 20 and 27 are flow charts of storing and reading out of the image data in this mode.

(4-6) Superimpose mode for storing the binary mono-color image signal

In this mode, the superimpose image is an image of one printing color such as black color. In the case that a multi-level image data is stored in the memory 401, a proper color correction is made for image data so as to be easily converted into the image of black color.

However, in the present preferred embodiment, the binarized signal is stored in the memory 401. Storing and reading out of the binarized mono-color signal are performed substantially similarly to the mode for storing the binary color image signal, however, there is a difference between both the modes.

In the mode for storing the binary image signal, since binarized image data for which a proper color correction has been made is stored in the memory 401, three memories 401a, 401b and 401c for storing the multi-level image signals of red color, green color and blue color are required in order to store a color image data therein. On the other hand, one memory is required for storing an image signal of mono-color. Therefore, in the case that the image data of one printing color is stored in the memory 401, it is possible to store not only one image but also plural images in the memory 401. The CPU 25 specifies the memory by the chip select control signal $\overline{\text{CS}}$, and also outputs the fixed offset address and write or read area setting signal. In this case, for example, even in the read area where memory image is printed, when the image of yellow color is printed, the image data stored in the memory 401 is read out. On the other hand, when the image of magenta color is printed, the image data is not read out. In order to realize the above action, the selector 444 is arranged as described above. Then, when the chip select control signal $\overline{\text{CS}}$ is "111", the selector 444 outputs white data which is input to the input terminal B thereof so that printing of the image data is inhibited. It is to be noted that the subscan clock generator is set in the equal magnification mode.

Figure 21:
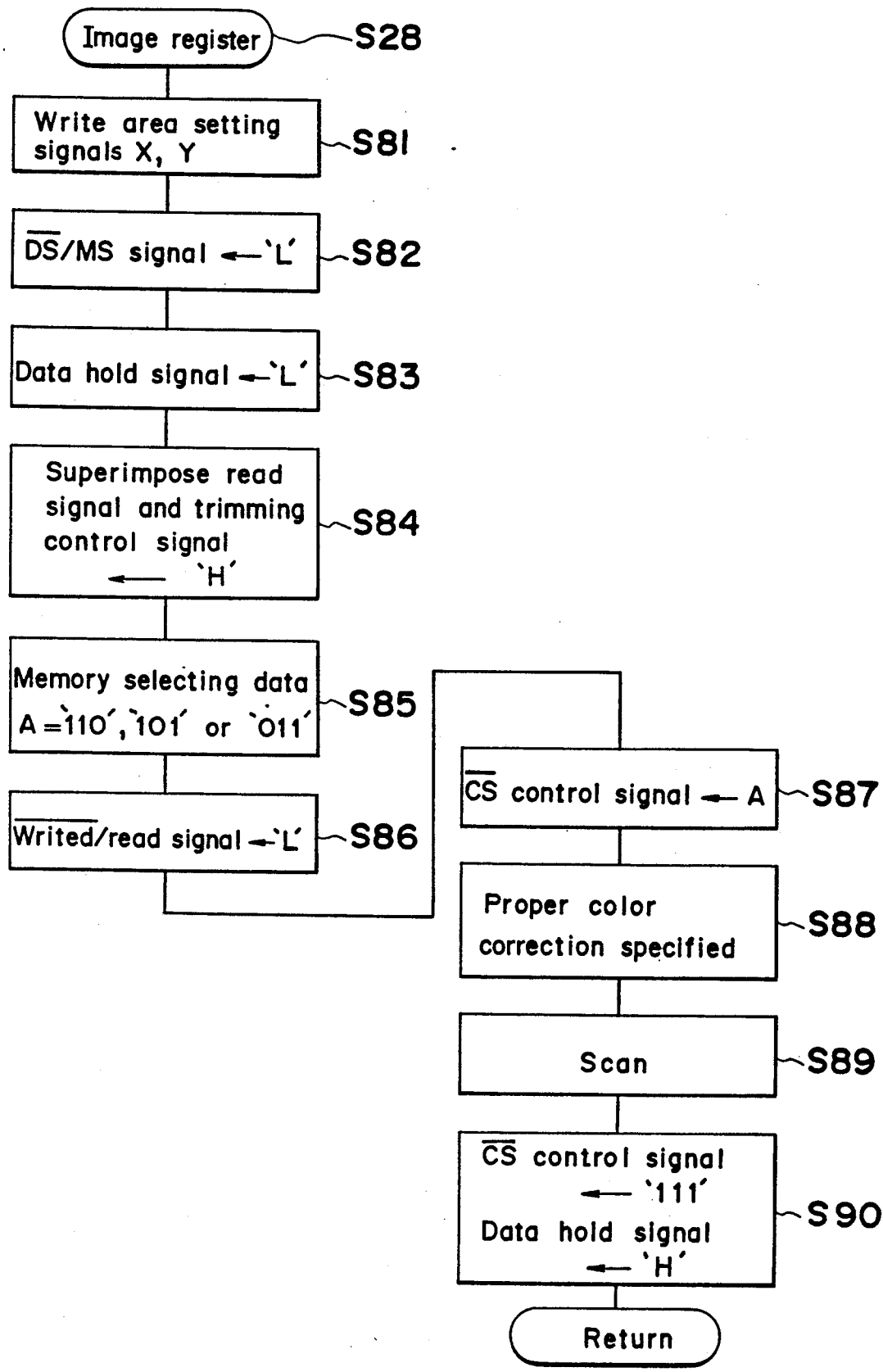
FIG. 21 is a flow chart of an image register processing in the superimpose mode for storing the binary mono-color image signal.
Figure 28:
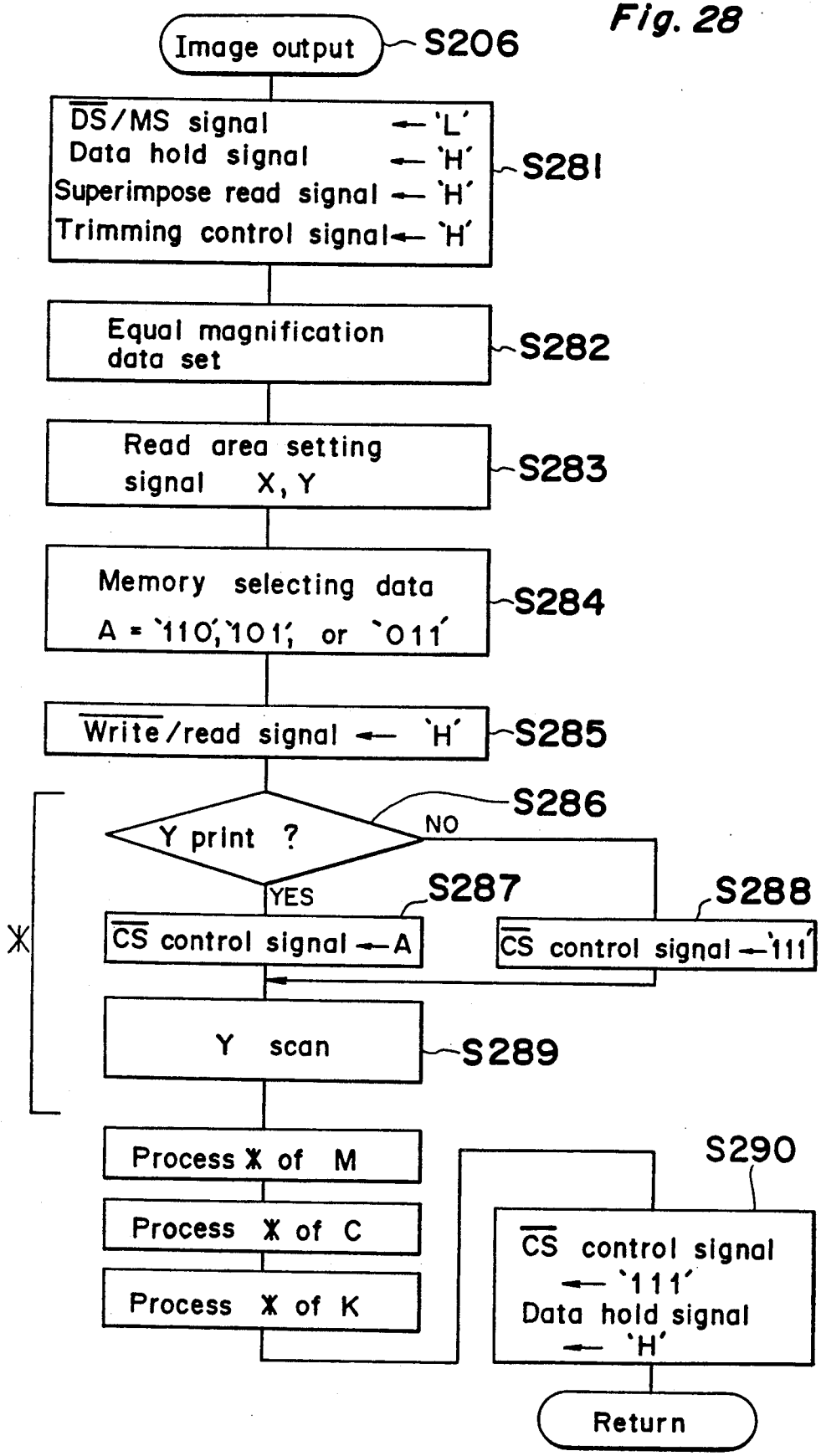
FIG. 28 is a flow chart of an image output processing in the superimpose mode for storing the binary mono-color image signal.

FIGS. 21 and 28 are flow charts of storing and reading out of the image data in this mode.

(4-7) Mode for storing both of the multi-level image signal and the binary image signal It is possible to store both of the multi-level image signal and the binary image signal. In the present preferred embodiment, both of the addresses in the main scan direction and the subscan direction are converted into the address of one dimension for accessing the memory 401. When the image data is stored in the memory 401, the CPU 25 sets the fixed offset address by taking the empty capacity of the memory 401 into consideration. The binary mono-color image signal and the multi-level or binary color image signal are stored in the memory 401 as follows.

Figure 11:
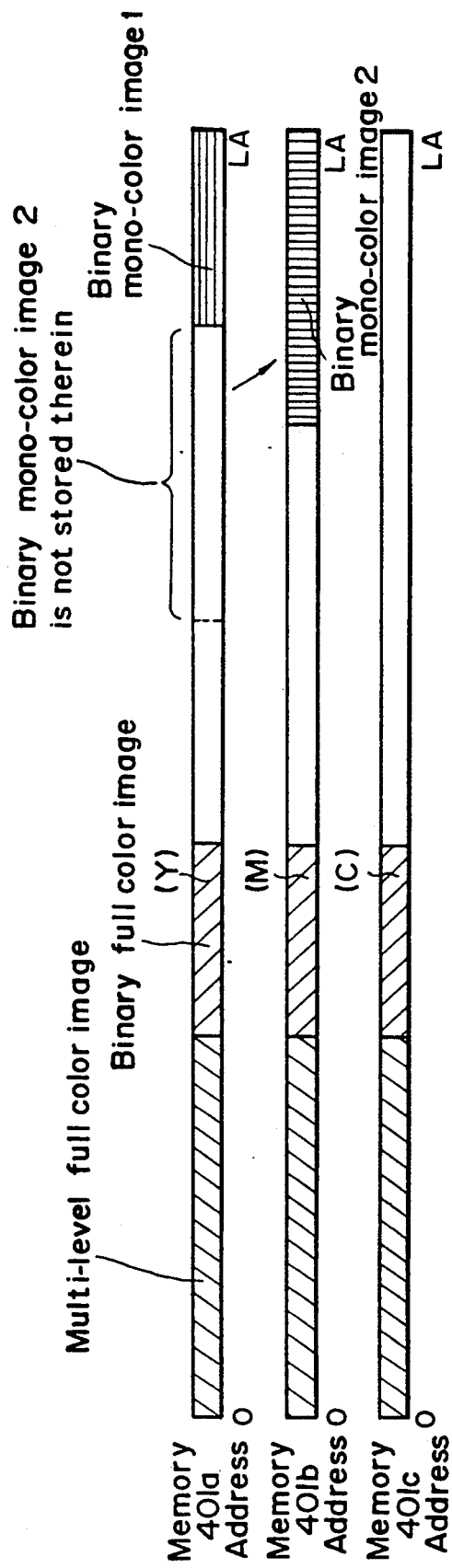
FIG. 11 is a memory map showing a mode for storing both of a multi-level image data and a binary image data.

As shown in FIG. 11, the multi-level or binary color image data is stored in order from the same head address of respective memories 401a, 401b and 401c. On the other hand, in the case of the binary mono-color image, the fixed offset address of the write address is calculated so that the last image data is stored in the maximum address, and the binary mono-color image is stored in the memory 401. In this case, the binary mono-color image is stored so that the head address of the image data does not become small, namely, so as to be stored in respective memories 401a, 401b and 401c on average. Otherwise, for example, if the binary mono-color image is stored in the memory 401a concentratedly, the register possible area for the color image decreases.

As shown in FIG. 11, the binary mono-color image 2 is not stored in the previous address of the binary mono-color image 1 of the memory 401a, and is stored from the maximum address LA of the memory 401b.

(4-8) Area judgment circuit and Address generating counter

The write (read) area judgment circuit 402 (408) and address generating counter 403 (409) will be described, referring to FIG. 12. In order to store and read out the image data, the area judgment circuit and the address generating counter having the same composition are used. The difference therebetween is to use the subscan clock signal and the overflow signals $x_0$ and $Y_0$ when the image data is read out.

Figure 12:
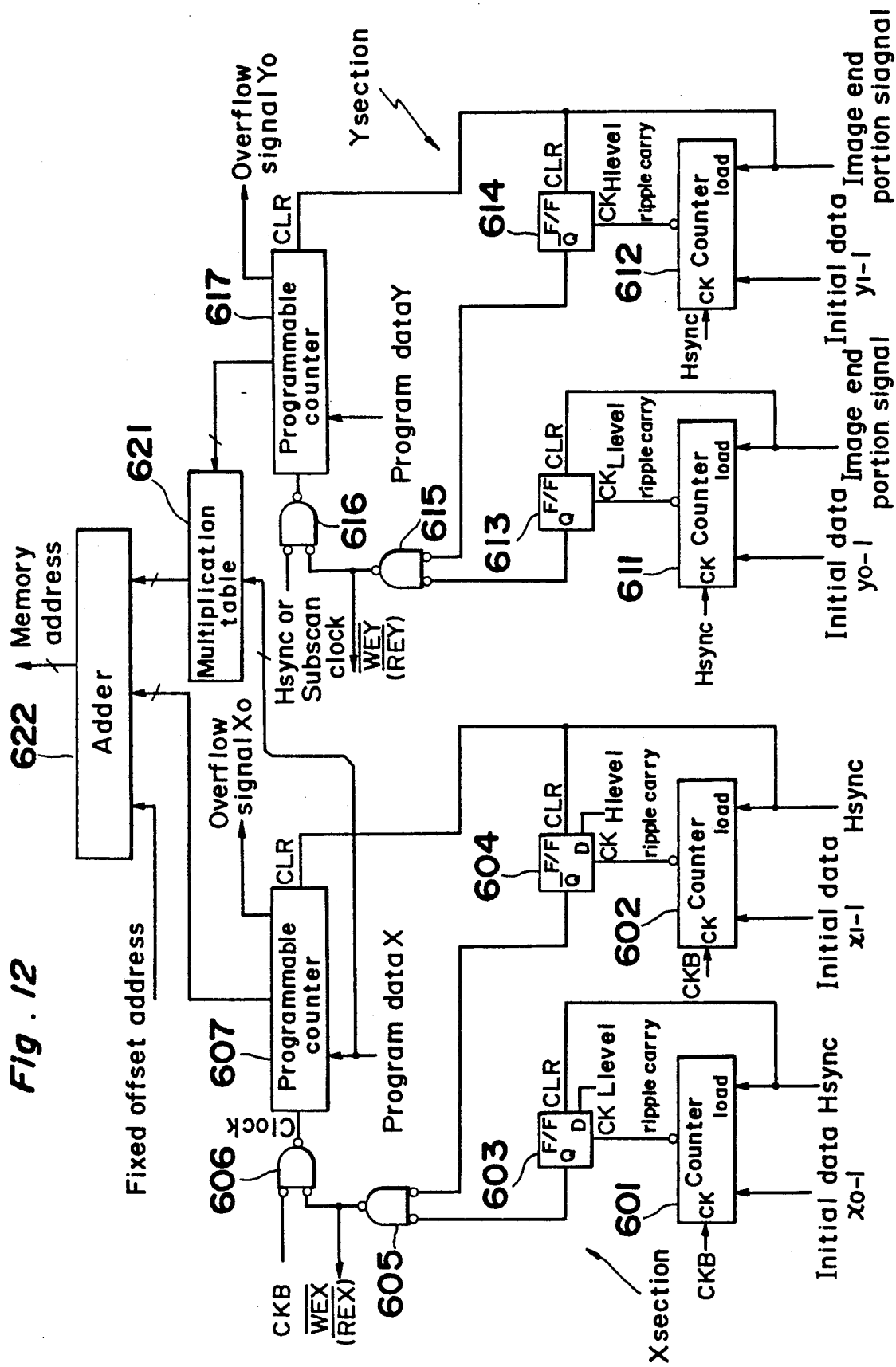
FIG. 12 is a block diagram of an area judgment circuit and an address generating circuit.

In FIG. 12, the X section 402a (408a) of the write (read) area judgment circuit 402 (408) is comprised of counters 601 and 602, delay type flip flops 603 and 604, and an AND gate 605. The CPU 25 outputs the initial data $(x_0-1)$ and $(x_1-1)$ for setting the X-coordinates of the top left edge and the bottom right edge of the write (read) area to the preset terminals of the down counters 601 and 602, and the horizontal synchronizing signal Hsync is sent to the load terminal thereof. Therefore, when the counters 601 and 602 receive the horizontal synchronizing signal Hsync, the initial data $(x_0-1)$ and $(x_1-1)$ in the counters 601 and 602, respectively, wherein $x_0$ is the X-coordinate of the top left edge of the rectangular write (read) area, and $x_1$ is the X-coordinate of the bottom right edge of the area. The clock signal CKB is input to respective clock terminals of the counters 601 and 602. Therefore, when the counters 601 and 602 receive the clock signal CKB, the counting values of the counters 601 and 602 are decreased by one. When the counting value thereof becomes zero, the counters 601 and 602 generate a ripple carry signal, and outputs it to the delay type flip flops 603 and 604, a High level signal is input to the D terminal of the flip flop 604. The Q output of the flip flop 603 becomes a High level on the leading edge of the horizontal synchronizing signal Hsync After the flip flop 603 counts $x_0$ clock signals, the Q output thereof becomes a Low level on the leading edge of the ripple carry signal. On the other hand, the $\overline{Q}$ output of the flip flop 604 becomes a Low level on the leading edge of the horizontal synchronizing signal Hsync. After the flip flop 604 counts $x_1$ clock signals, the $\overline{Q}$ output thereof becomes a High level on the leading edge of the ripple carry signal. The Q output signal of the flip flop 603 and the $\overline{Q}$ output signal of the flip flop 604 are sent to the input terminals of the AND gate 605, respectively. Therefore, when the counting value x is in the range from $x_0$ to $x_1$, the output terminal of the AND gate 605 becomes a Low level.

Figure 13:
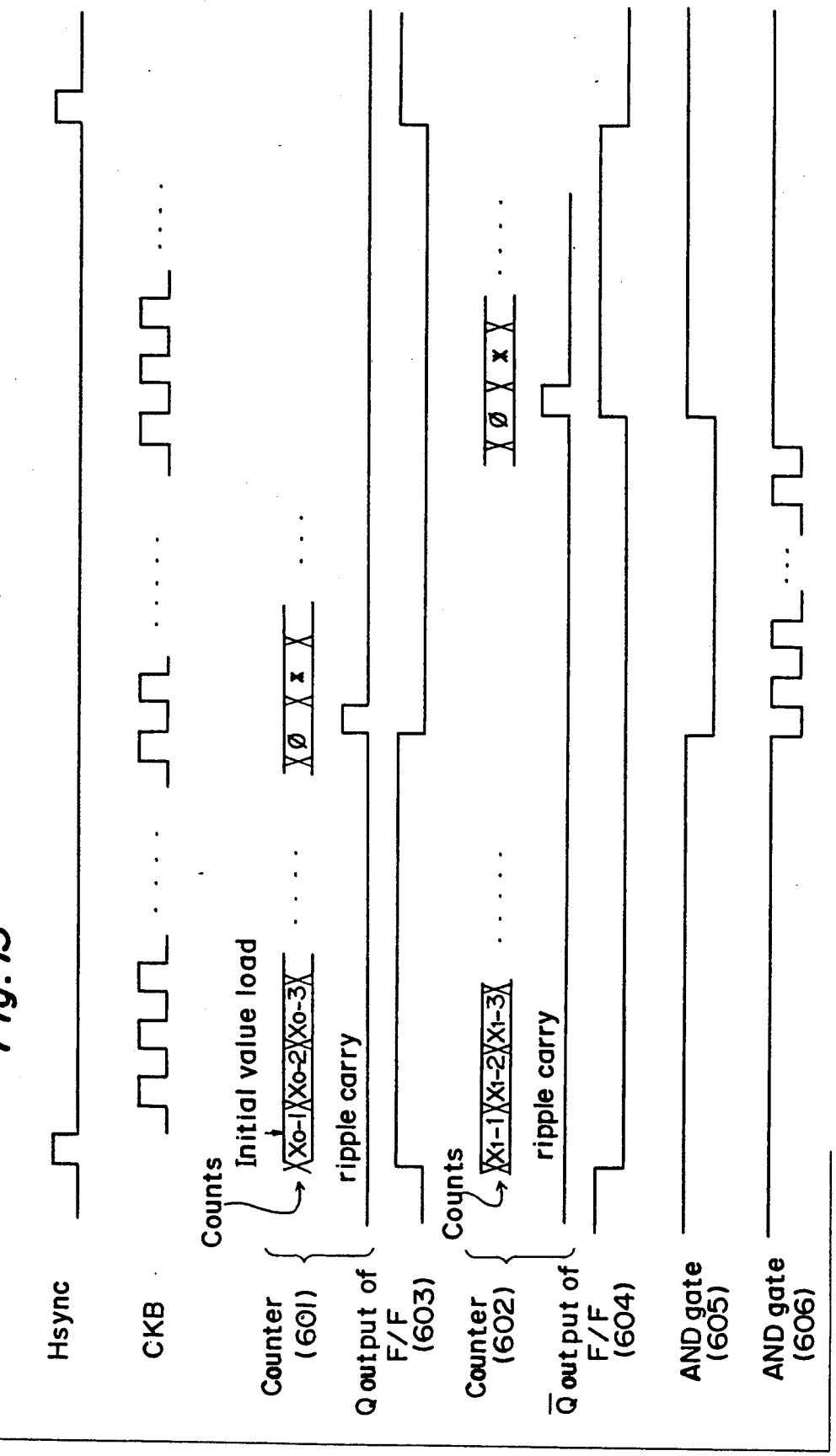
FIG. 13 is a timing chart showing an action of the area judgment circuit.

FIG. 13 is a timing chart showing an action of the area judgment circuit.

An initial data "$x_0-1$" is set as an initial value in the counter 601 by the CPU 25, and then, the counter 601 starts to count. The counter 601 decreases the counting value by one in accordance with the clock signal CKB. After the counter 601 receives $x_0$ clock signals CKB, the counter 601 generates the ripple carry signal. In accordance with the ripple carry signal, the $\overline{Q}$ output of the flip flop 603 is inverted, and then, the flip flop 603 outputs a low level signal to an AND gate 605. On the other hand, after an initial data "$x_1-1$." is set in the counter 602 and the counter 602 receives $x_1$ clock signals CKB, the Q output of the flip flop 604 is inverted, and the flip flop 604 outputs a High level signal to the AND gate 605. When the flip flops 603 and 604 are cleared, the Q output of the flip flop 603 and the $\overline{Q}$ output of the flip flop 604 becomes a High level and a Low level, respectively. If $x_0 < x_1$, the output $\overline{WEX}$ ($\overline{REX}$) of the AND gate 605 becomes a Low level on the condition of $x_0 < x < x_1$.

The X section 403a (409a) of the write (read) address generating counter 403 (409) is comprised of an AND gate 606 and a programmable counter 607. The output signal of the AND gate 606 is sent to the programmable counter 607 as a clock signal. Therefore, when the output signal $\overline{WEX}$ of the AND gate 605 becomes a Low level, the AND gate 606 sends another clock signal CKB to the programmable counter 607. The program data X is set as an divisor data in the programmable counter 607 by the CPU 25, and then, the counter 607 starts to count the clock signal CKB, cyclicly.

If the length of the register image in the main scan direction corresponds to 1 clock signals CKB, the following relationship is kept by the CPU 25.

$$X = x_1 - x_0 = l$$

Furthermore, in the case that n images are printed in the main scan direction in the mosaic monitor mode (See FIG. 7), the following relationship is kept by the CPU 25.

$$X = (x_1 - x_0)/n = l$$

In the mode for storing the binary image signal, the following relationship is kept by the CPU 25.

$$X = (x_1 - x_0)/8n = l/8$$

The Y section 402b (408b) of the write (read) area judgment circuit 402 (408) is comprised of counters 611 and section 403b (409b) of the write (read) address generating counter 403 (409) is comprised of an AND gate 616 and a programmable counter 617. The composition and the action thereof is substantially same as that of the X section 402a (408a) of the write (read) area judgment circuit 402 (408) and the X section 403a (409a) of the write (read) address generating counter 403 (409). The differences therebetween are as follows. Initial data $(y_0-1)$ and $(y_1-1)$ are set in the counters 611 and 612 by the CPU 25, respectively. The horizontal synchronizing signal Hsync or the subscan clock signal is input to the AND gate 616 in place of the clock signal CKB. The image end portion signal is input to respective load terminals of the counters 611 and 612 and the CLR terminal of the flip flops etc. in place of the horizontal synchronizing signal Hsync. The program data $Y=1$ is set in the programmable counter 617. Furthermore, the programmable counters 607 and 617 generate the overflow signals $x_0$ and $Y_0$, respectively.

The counting values of the programmable counters 607 and 617 can be generated as the address of the memory 401. For example, if the program data is in the form of the power of two, the output of the programmable counter 607 is outputted as lower bits of the address, and the output of the programmable counter 617 is outputted as higher bits of the address. However, otherwise, the using efficiency of the memory 401 decreases.

In the present preferred embodiment, in order to increase the using efficiency of the memory 401, both the addresses in the main scan direction and the subscan direction are converted into the memory address of one dimension. Even though the ratio of the length and the height of the specific area, the image data can be stored and read out if the specific area is within the whole capacity of the memory 401 (Yes at step S26 in FIG. 18). Concretely, a multiplication table 621 is further provided to which the program data X and the output data of the programmable counter 607 is input as the address thereof. The fixed offset address (step S27 in FIG. 18 and step S205 in FIG. 25) which the CPU 25 calculates, namely the head address of the memory, the output of the programmable counter 607, and the output of the multiplication table are added by an adder 622 so as to calculate the real address of the memory 401.

As described above, the composition of the write area judgment circuit 402 and the address generating counter 403 is substantially same as that of the read area judgment circuit 408 and the read address generating counter 409 except for use of the subscan clock signal. In the above embodiment, the write address and the read address are selected by the selector 404, however, the above circuits for writing the image data and the above circuits for reading out the image data may be used commonly.

(4-9) Storing and reading processing of plural images

Figure 14A:
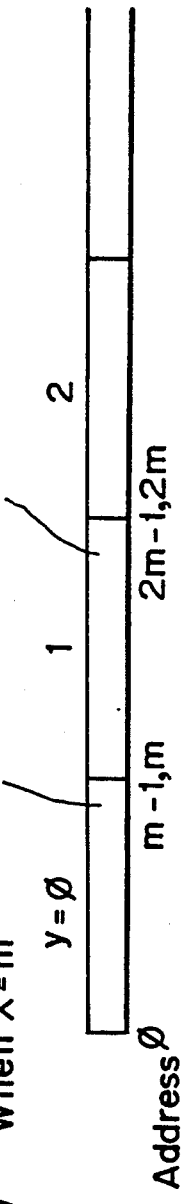
FIG. 14 is a memory map showing the case that plural image data having same size is stored in a memory.
Figure 14B:
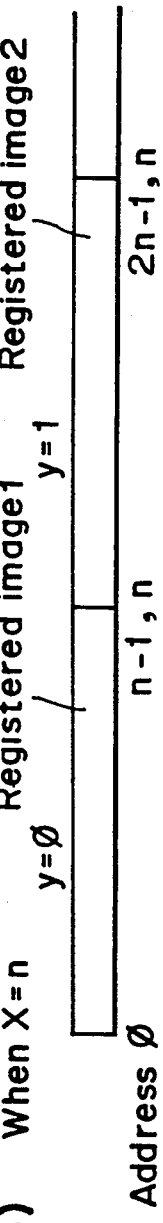

The fixed offset address is input to the adder 622 from the CPU 25 in order to store and read out plural images, which represents the head address of the next register image so that the new image is stored in the memory without erasing the image which has been stored therein. For example, if the capacity of one register image is m as shown in FIG. 14, data m, 2m, 3m, . . . are input to the adder 622 as the fixed offset address. On the other hand, if the capacity of the registered image 1 is M addresses and the capacity of the registered image 2 is N addresses, (M+N) addresses are input to the adder 622 as the fixed offset address in order to store a new image 3.

When the image data is registered, the CPU 25 makes a memory store the fixed offset address and the program data X and Y for the registered image. Then, those data is set according to selection of the operator so as to read out any registered image (See FIG. 25). Furthermore, it is possible to read out plural registered images.

The plural area judgment circuits and the plural address generating counters may be arranged in parallel, and then, plural images can be selected from the images stored in the memory 401 so as to print them at any plural positions on a copying paper.

(5) Color tone setting circuit

Figure 16:
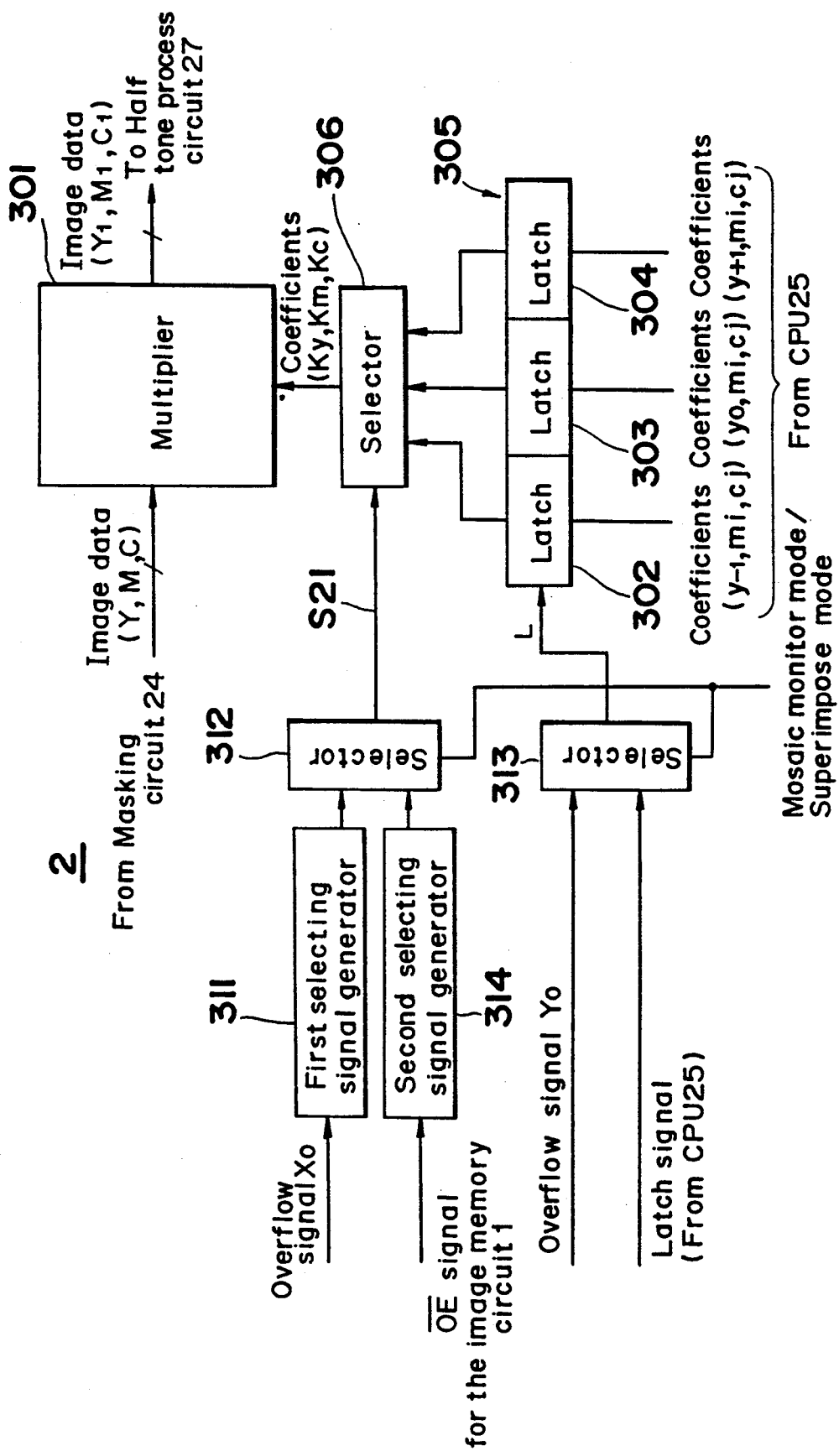
FIG. 16 is a block diagram of a color tone setting circuit.

FIG. 16 is a circuit diagram of the color tone setting circuit 2.

The color tone setting circuit 2 is arranged at the next step of the masking circuit 24, and makes the color adjustment in the mosaic monitor mode.

The masking process circuit 24 converts respective image data of red color, green color and blue color into image data Y, M, C and K for printing which correspond to respective printing colors of yellow color, magenta color, cyan color and black color, and outputs the converted image data to the color tone setting circuit 2.

The well known conversion equation for converting the original image data R, G and B into the printing image data Y, M and C is expressed as follows:

$$\begin{bmatrix} Y \\ M \\ C \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} B \\ G \\ R \end{bmatrix}$$

Respective conversion coefficients $a_{00}$ to $a_{22}$ are predetermined at proper values according to the theory and the result of the experiment so that the color image reflecting that of the original document faithfully can be obtained.

In the color adjustment of the color tone setting circuit 2, the following multiplications are performed for respective image data Y, M and C calculated by the above calculation in order to obtain the adjusted printing image data $Y_1$, $M_1$ and $C_1$.

$$Y_1 = K_y \times Y,$$

$$M_1 = K_m \times M,$$

$$C_1 = K_c \times C,$$

wherein $K_y$ is the color adjustment coefficient of yellow color, $K_m$ is the color adjustment coefficient of magenta color, and $K_c$ is the color adjustment coefficient of cyan color.

It is to be noted that, the printing image data K of black color is outputted for a picture element only when all the respective image data of yellow color, magenta color and cyan color are outputted since it is not necessary to make the color adjustment.

In the mosaic monitor mode, different sets of color adjustment coefficients are applied to respective blocks shown in FIG. 7. That is, the reading area designated by the coordinates $P_0(x_0, y_0)$ and $P_1(x_1, y_1)$ is divided into 27 blocks of three rows in the main scan direction X and nine columns in the subscan direction Y, and different sets of color adjustment coefficients are set at respective blocks. In this case, the color adjustment coefficient Ky of yellow color does not vary in the subscan direction Y, however, the coefficient Ky varies in the main scan direction X so that three kinds of coefficients $y_{-1}$ $y_0$ and $y_{+1}$ are set at the three blocks in the main scan direction X, respectively. The color adjustment coefficient Km of magenta color does not vary in the main scan direction X, however, the coefficient Km varies in the subscan direction Y in the order of $m_0, m_1, m_2, m_0, m_1, \ldots$ every block. The color adjustment coefficient Kc of cyan color does not vary in the main scan direction X, however, the coefficient Kc varies in the subscan direction Y every three blocks in the order of $c_1, c_0$ and $c_{+1}$.

Therefore, the color tone setting circuit 2 sets the color adjustment coefficients every block of the mosaic monitor image as described above, for respective printing image data Y, M and C in the mosaic monitor mode, and outputs the adjusted printing image data to the magnification varying circuit 26.

Figure 15:
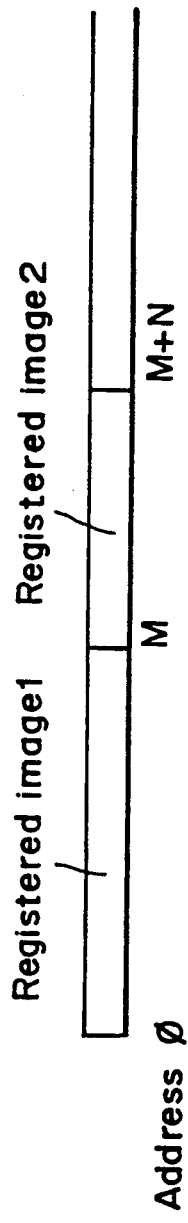
FIG. 15 is a memory map showing the case that plural image data having different sizes is stored in the memory.

FIG. 15 is a block diagram of the color tone setting circuit 2 for calculating the printing signals $Y_1$, $M_1$ and $C_1$.

Referring to FIG. 16, a multiplexer 301 calculates the aforementioned printing image data $Y_1$, $M_1$ and $C_1$ by using the above equations from the image data Y, M and C input from the masking circuit 24, and outputs the printing image data $Y_1$, $M_1$ and $C_1$ to the half tone process circuit 27. There is provided a latch circuit 305 comprised of three latches 302, 303 and 304 for respectively latching respective three coefficients in the main scan direction X in the mosaic monitor mode, which are input from the CPU 25. Three coefficients latched in the latch circuit 305 correspond to three blocks in the main scan direction, respectively. Every time a subscan clock signal for varying the magnification is input to the CPU 25 as the interruption signal, the CPU 25 performs an interruption process shown in FIG. 14a and 14b, and the CPU 25 outputs a latch signal to the color tone setting circuit 2 every block in the subscan direction Y so as to make the latches 302, 303 and 304 latch respective new three coefficients for the next three blocks in the subscan direction Y.

The reason why the above latch circuit 305 comprised of three latches 302, 303 and 304 are provided is that the alteration period of the above coefficients in the main scan direction is relatively shorter than the operation period of the CPU 25, and it is difficult for the CPU 25 to set the above coefficients in the latches 302, 303 and 304 at real time. It is to be noted that, in the case of n kinds of color adjustment coefficients, n latches are provided in parallel.

In the mosaic monitor mode, the selector 306 selects one of the coefficients which the latches 302 to 304 output according to the signal S21 which is input thereto through the selector 312, and outputs the selected one to the multiplier 301. The multiplier 301 calculates the product of the image data (Y, M, C) which is input from the masking process circuit 24 and respective coefficients, respectively, to obtain the printing signal ($Y_1$, $M_1$, $C_1$), and outputs it to the magnification varying circuit 26.

The color adjustment coefficients for the next three blocks are input to the setting input terminals of respective latches 302 to 304. Every time the subscan clock signal is input to the CPU 25 as an interruption signal, the interruption processing (See FIGS. 24a and 24b) are performed, and then, the overflow signal $Y_0$ is sent as a latch signal L to the latch circuit 305 through the selector 313, and the color adjustment coefficients are set as described above.

The selection of the coefficients which are set in the multiplier 301 will be described below.

The image memory circuit 1 outputs an overflow signal $x_0$ in the main scan direction generated upon reading out the image data stored in an image memory 401 to a first selecting signal generator 311. Every time the first selecting signal generator 311 receives the overflow signal $x_0$, i.e., every block of the mosaic monitor image, the first selecting signal generator 311 outputs a signal S21 to a selector 306 through a selector 312 so that the selector 306 connects the multiplier 301 selectively to respective latches 302 to 304. In the mosaic monitor mode, the selector 312 outputs the signal S21 input from the first selecting signal generator 311 to the selector 306. In accordance with the signal S21, the selector 306 sends one of respective coefficients latched in the latches 302 to 304 of the latch 305 to the multiplier 301 selectively every block.

On the other hand, the image memory circuit 1 outputs an overflow signal $Y_0$ in the subscan direction generated upon reading out the image data stored in the image memory 401 to the selector 313. In the mosaic monitor mode, the selector 313 outputs the overflow signal $Y_0$ to the latch circuit 305. In accordance with the overflow signal $Y_0$, the latches 302 to 304 latch a set of color adjustment coefficients input from the CPU 25 so as to renew them. That is, as soon as the blocks to be processed are changed in the subscan direction to the next blocks, the set of color adjustment coefficients are altered.

In the mosaic monitor mode, when the operator selects a desirable set of color adjustment coefficients, the selected set of color adjustment coefficients may be set in the latch 302, and may be outputted to the multiplier 301.

The above color adjustment is made for respective printing colors Y, M and C.

Next, the color adjustment in the superimpose mode will be described. In the superimpose mode, the coefficients for copying the document and the coefficients for the superimpose area are set as an initial data in the first latch 302 and the second latch 303, respectively. In order to output those data to the output terminal of the latch circuit 305, the latch signal L which the CPU 25 outputs is input to the latch circuit 305. Furthermore, the selector 312 selects the output signal of the second selecting signal generating circuit 314 so as to output it to the selector 306. When the $\overline{OE}$ signal of the memory 401 becomes a High level, the second selecting signal generator 314 outputs a signal S21 to the selector 312 so that the selector 312 selects the output signal of the first latch 302. On the other hand, when the $\overline{OE}$ signal of the memory 401 becomes a Low level, the second selecting signal generator 314 outputs the signal S21 to the selector 312 so that the selector 312 selects the output signal of the second latch 303. Therefore, in the superimpose mode, in the case that the document read image is printed, the color adjustment is made according to the coefficients set in the first latch 302. On the other hand, in the case that the image data stored in the memory 401 is read out, the color adjustment is made according to the coefficients set in the second latch 303. Of course, different setting data are set in the latches 302 and 303 for respective printing colors.

In the other modes than the superimpose mode and the mosaic monitor mode, the image data is not processed in the color tone setting circuit 2 so as to be sent to the magnification varying circuit 26.

(6) Control flow of copying operation

Figure 17:
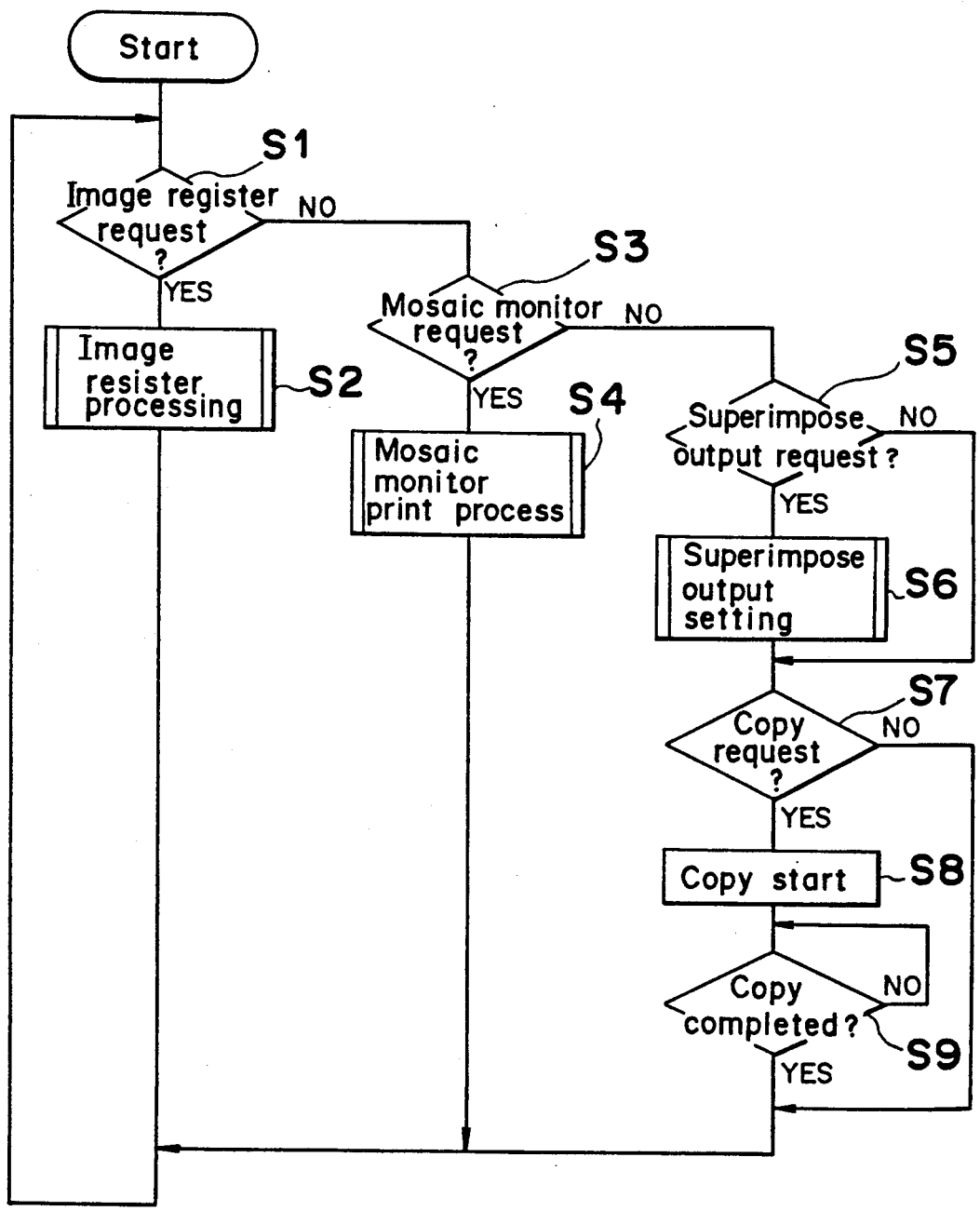
FIG. 17 is a flow chart showing control of the digital color copying machine in the superimpose mode and in the mosaic monitor mode.

FIG. 17 is a main flow of control of the digital color copying machine in the superimpose mode and in the mosaic monitor mode. When the function key 78 or 79 of the operation panel 70 is pushed down, the program flow enters the superimpose mode or the mosaic monitor mode, respectively, and the main program flow shown in FIG. 17 starts.

Figure 18:
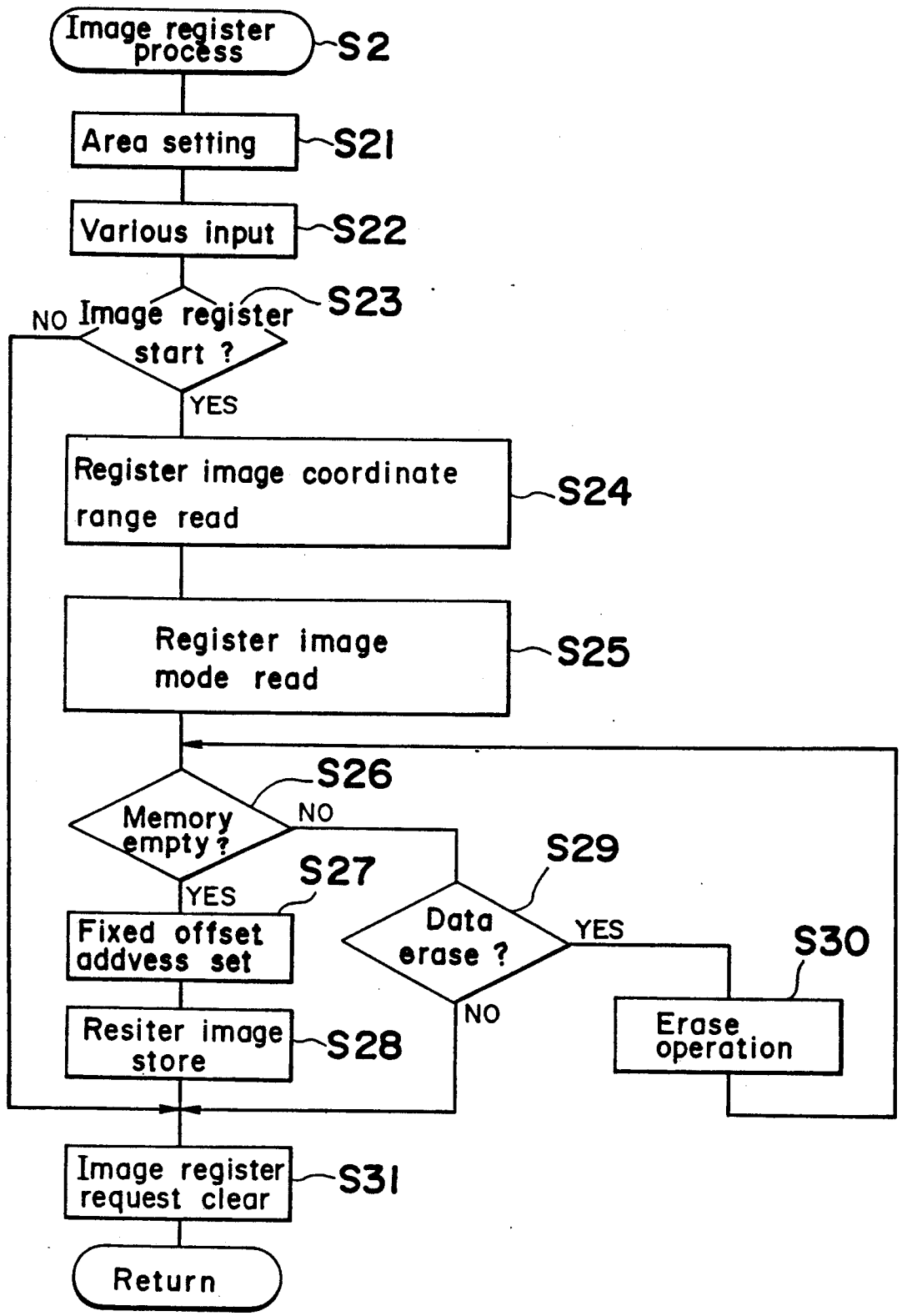
FIG. 18 is a flow chart of an image register processing.

Referring to FIG. 17, if the image register processing is requested (Yes at step S1), the image register processing is performed at step S2 (See FIG. 18). The image register means that the image data of the specific area is stored in the memory 401. In the image register processing (step S2), the operator sets a desirable area, and the image data of the area is stored in the memory 401.

Normally, when the mosaic monitor mode is selected, the image register processing is requested (Yes at step S1) and also the printing processing of the mosaic monitor image is requested (Yes at step S3). When the superimpose mode is selected, the image register processing is requested (Yes at step S1) and also the output processing of the superimpose image is requested (Yes at step S5).

If the printing processing of the mosaic monitor image is requested (Yes at step S3), the printing processing of the mosaic monitor image (step S4, See FIG. 22) is performed. Namely, the image data stored in the memory is read out, various color adjustment is made for the image data, and the mosaic monitor image is printed on a copying paper. Thereafter, the operator selects a image having a desirable color balance from plural images of the mosaic monitor image, and a copying operation is performed so that a copy of the image having the selected color balance can be obtained.

Figure 25:
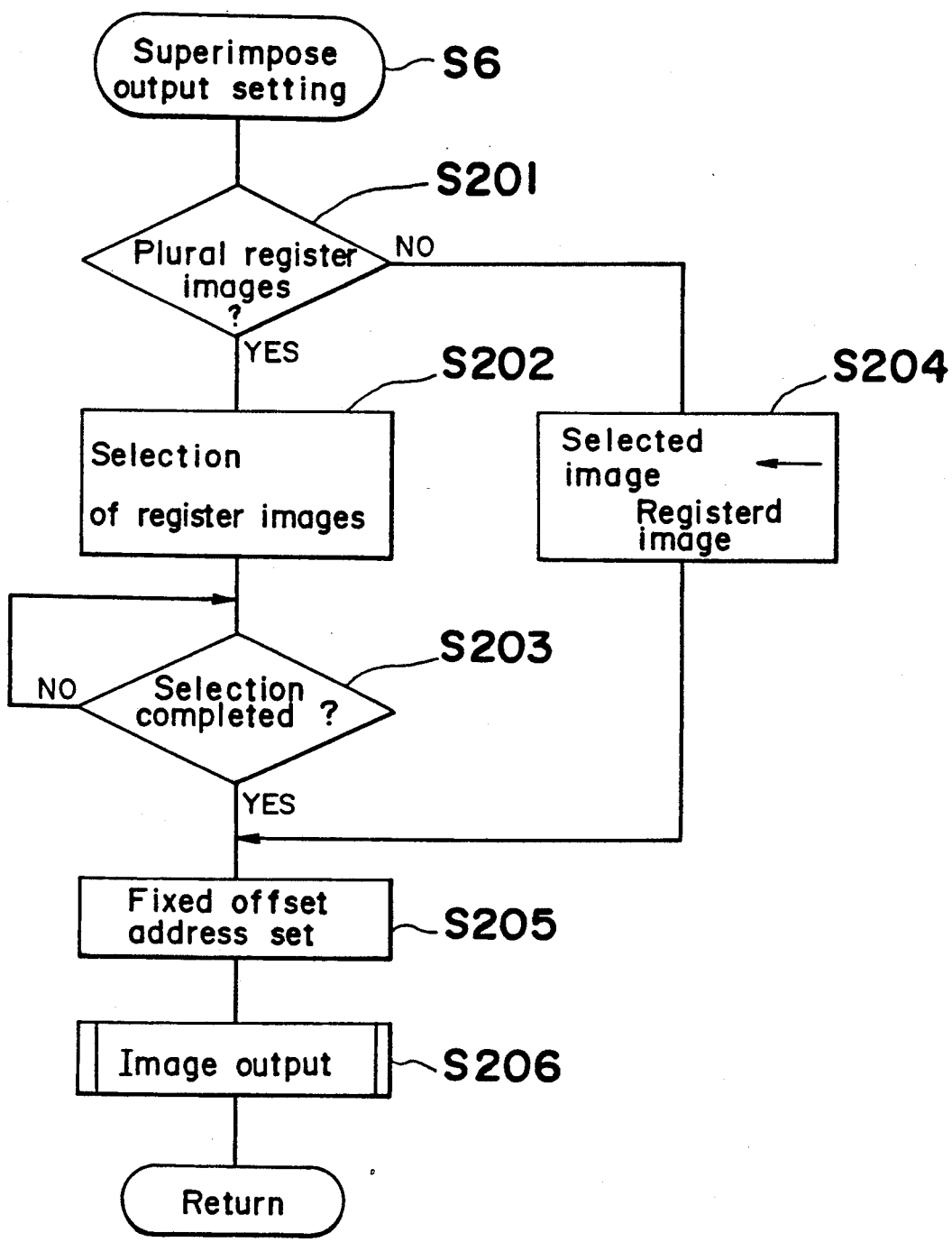
FIG. 25 is a flow chart of an output setting processing of the superimpose image.

If the output processing of the superimpose image is requested (Yes at step S5), setting for the output processing of the superimpose image is performed at step S6 (See FIG. 25). Namely, after it is checked whether or not there are plural register images, setting for reading out the image data stored in the memory is performed. Thereafter, if a copying operation is requested (Yes at step S7), the copying operation is performed so that the register image is printed so as to be superimposed on the document image at steps S8 and S9.

If all the image register processing, the printing processing of the mosaic monitor image and the output processing of the superimpose image are not requested (No at steps S1, S3 and S5), a normal copying operation is performed at steps S7 to S9.

FIG. 18 is a flow chart of the image register processing (step S2).

Referring to FIG. 18, after the set key 76 of the operation panel 70 is pushed down, the area setting value is input according the message displayed on the display section 84. Thereafter, the other various input values such as the magnification, and the binary storing or the multi-level storing are set at step S22. Then, it is judged whether or not the image register processing can be started at step S23. If the image register can not be started (No at step S23), the program flow goes to step S31, and then, the request of the image register is cleared, and the program flow returns.

If the image register processing can be started (Yes at step S23), the coordinates of the top left edge and the bottom right edge of the register image area are calculated at step S24 from the area setting value set at step S21. Thereafter, one of the register image mode is set at step S25. In the register image mode, there are the following four modes.

(a) the superimpose mode for storing the multi-level color image signal (b) the mosaic monitor mode (c) the superimpose mode for storing the binary color image signal (d) the superimpose mode for storing the binary mono-color image signal.

Figure 19:
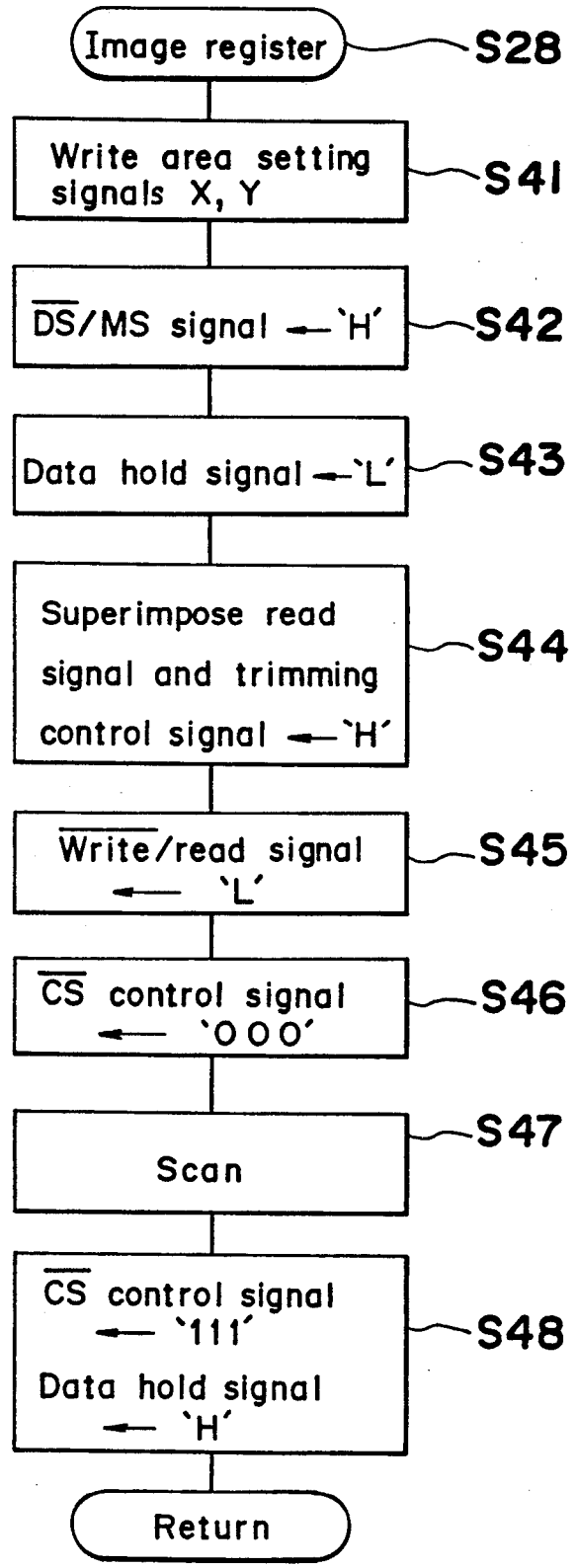
FIG. 19 is a flow chart of an image register processing in the superimpose mode for storing the multi-level image signal and in the mosaic monitor mode.

Thereafter, if it is judged that there is a necessary empty area in the memory 401 (Yes at step S26), the fixed offset address for setting the memory address is set and stored at step S27, and various data is set in the image memory circuit 1 according to the register image mode at step S28 (See FIGS. 19 to 21). Thereafter, the request of the image register processing is cleared at step S31, and then, the program flow returns.

If it is judged that there is no necessary empty area in the memory 401 (No at step S26), it is input whether or not the image data which has been registered at the previous step is erased. If it is input that the above image data is erased (Yes at step S29), the above image data is erased at step S30, and then, the program flow goes back to step S26. On the other hand, if it is input that the above image data is not erased (No at step S29), the program flow goes to step S31, and then, the request of the image register processing is cleared, and the program flow returns.

FIG. 19 is a flow chart of the register image writing process (step S28) in the superimpose mode for storing the multi-level image signal or in the mosaic monitor mode.

Referring to FIG. 19, first of all, various control data is set in the image memory circuit 1. Namely, the CPU 25 outputs the write area setting signals X and Y to the write area judgment circuit 402 at step S41, and the binary storing/multi-level storing signal is made a High level at step S42. Thereafter, the data hold signal is made a Low level at step S43, and the superimpose read signal and the trimming control signal are made a High level at step S44. Thereafter, the write/read signal is made a Low level at step S45, and the chip select control signal $\overline{CS}$ is made "000" so that all the memories 401a, 401b and 401c are selected at step S46. Then, the document is scanned at step S47, and the multi-level image data of the image register area (write area) is stored in the memories 401a, 401b and 401c. Thereafter, the chip select control signal $\overline{CS}$ is made "111" so that storing of the image data in the memory 401 is inhibited, and then, the data hold signal is made a High level at step S48 so that the image data stored in the memory 401 is held, and the program flow returns.

FIG. 20 is a flow chart of the register image storing process (step S28) in the superimpose mode for the binary color image signal.

Referring to FIG. 20, first of all, various control data is set in the image memory circuit 1. Namely, the CPU 25 outputs the write area setting signal X and Y to the write area judgment circuit 402 at step S61, and the binary storing/multi-level storing signal is made a low level at step S62. Thereafter, the data hold signal is made a Low level at step S63, the superimpose read signal and trimming control signal are made a High level at step S64, and the write/read signal is made a Low level at step S65. Thereafter, the document is scanned for respective printing colors Y, M and C, so that respective image data are stored. First of all, the chip select control signal $\overline{CS}$ is made "110" so as to select the memory 401a at step S66, the document is scanned for yellow color (Y) so that the binary image data of yellow color of the write area is stored in the memory 401a at step S67. Similarly, the memory 401b is selected at step S68, and the binary image data of magenta color is stored in the memory 401b at step S69.

Furthermore, the memory 401c is selected at step S70, and the binary image data of cyan color is stored in the memory 401c at step S71. Thereafter, the chip select control signal $\overline{CS}$ is made "111" so that writing of the image data in the memory 401 is inhibited, and the data hold signal is made a High level so that the image data stored in the memory 401 is held therein at step S72. Thereafter, the program flow returns.

In the case that the image data has been stored in the memory 401 at steps S67, S69 and S71, the fixed offset address has been set so that the image data is stored in the empty area thereof at step S27 shown in FIG. 18 (See FIG. 11).

FIG. 21 is a flow chart of the register image writing process (step S28) in the superimpose mode for storing the binary mono-color image signal.

Referring to FIG. 21, first of all, various control data is set in the image memory circuit 1. Namely, the CPU 25 outputs the write area setting signals X and Y to the write area judgment circuit 402 at step S81, the binary storing/multi-level storing signal is made a Low level at step S82, the data hold signal is made a Low level at step S83, and the superimpose read signal and the trimming control signal are made a High level at step S84. Thereafter, as described referring to FIG. 11, one of the memories 401a, 401b and 401c is selected so that the memory 401 can be utilized effectively. Namely, a memory selecting data A is made "110", "101", or "001" at step S85, and the write/read signal is made a Low level at step S86. Thereafter, the chip select control signal $\overline{CS}$ is made the above data A so that the memory is specified at step S87, a proper color correction such as a color correction corresponding to the relative luminous efficiency is specified to the masking process circuit 24 at step S88, and the document is scanned so that the image data is stored in the memory 401 at step S89. Thereafter, the chip select control signal $\overline{CS}$ is made "111" so that storing of the image data in the memory 401 is inhibited, and the data hold signal is made a High level at step S90 so that image data stored in the memory 401 is held, and then, the program flow returns.

Figure 22:
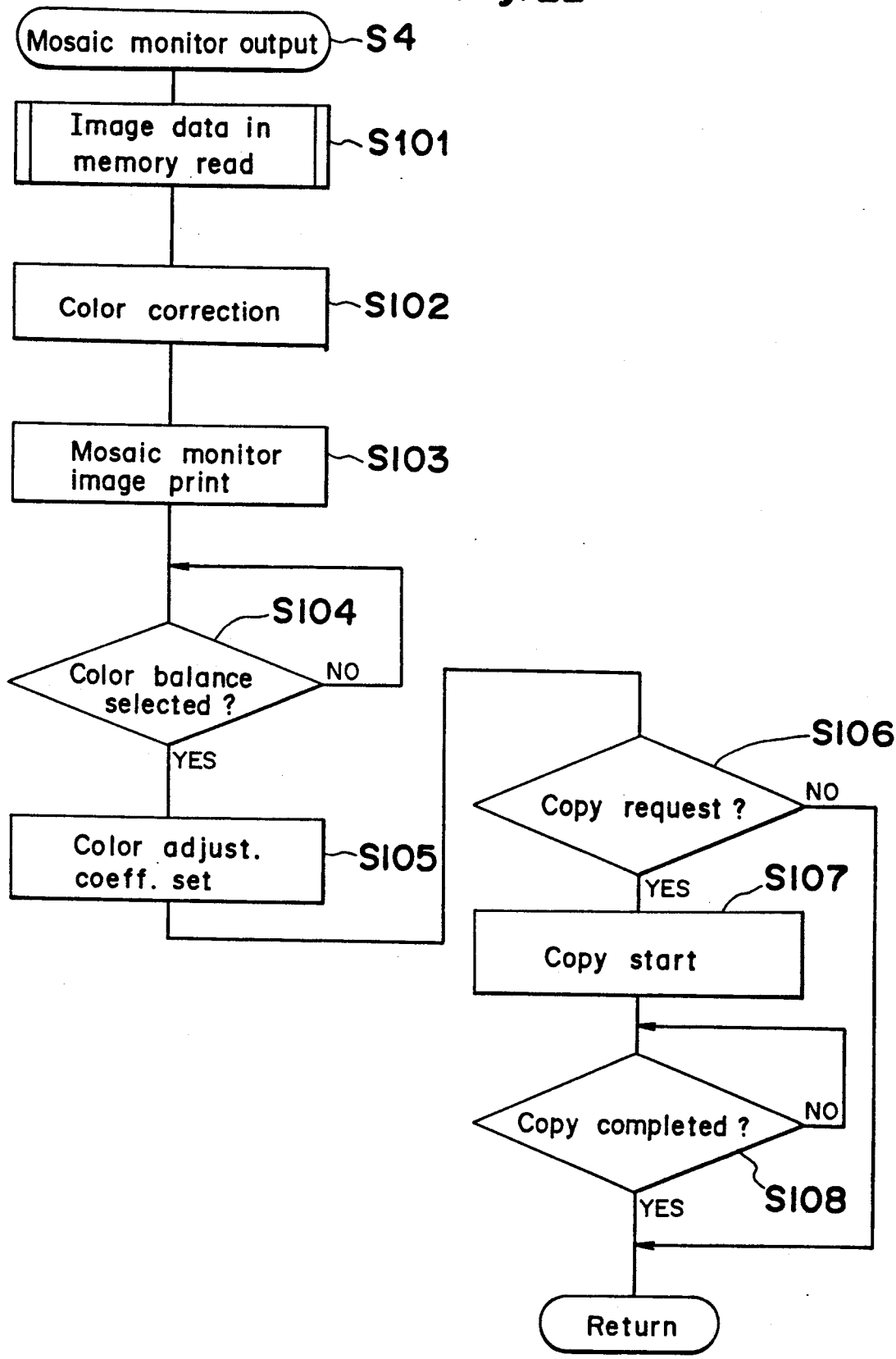
FIG. 22 is a flow chart of an output setting processing of the mosaic monitor image.

FIG. 22 is a flow chart of the printing processing of the mosaic monitor image (step S4).

Referring to FIG. 22, first of all, the registered image data stored in the memory 401 is read out at step S101 (See FIG. 23), the color correction is made for the read image data at step S102, and the mosaic monitor image is printed at step S103.

Thereafter, when the operator selects a desirable color balance at step S104, the color adjustment coefficients corresponding to the selected color balance are set at step S105. When the copy operation is requested (Yes at step S106), the copy operation for the document starts with the selected color balance at step S107, and respective document images of Y, M and C colors are printed. Thereafter, after the copying operation is completed (Yes at step S108), the program flow returns.

FIG. 23 is a flow chart of the reading processing (step S101) of the image data in the printing process of the mosaic monitor image.

Referring to FIG. 23, first of all, various control data is set in the image memory circuit 1. Namely, the CPU 25 outputs the read area setting signals X and Y corresponding to the instruction of the operator to the read area judgment circuit 408 at step S121, and the binary storing multi-level storing signal is made a High level at step S122. Thereafter, the data hold signal is made a High level at step S123, the superimpose read signal is made a Low level at step S124, the trimming control signal is made a High level at step S125, the write/read signal is made a High level at step S126, and the equal magnification data is set in the subscan clock generator 29 at step S127. In this mosaic monitor mode, since one register image is stored in the memory 401, the fixed offset address is made "0".

Thereafter, the chip select control signal $\overline{CS}$ is made "000" at step S128, all the memories 401a, 401b and 401c are selected, and the interruption process for setting the color adjustment coefficients (See FIGS. 24a and 24b) is permitted at step S129. Thereafter, the interruption processes for Y, M, C and K colors are performed, respectively, at step S130.

After the scan operation is completed, the interruption processing is inhibited at step S131, and the chip select control $\overline{CS}$ is made "111" so that writing of the image data in the memory 401 is inhibited at step S132, and then, the program flow returns.

Figure 24A:
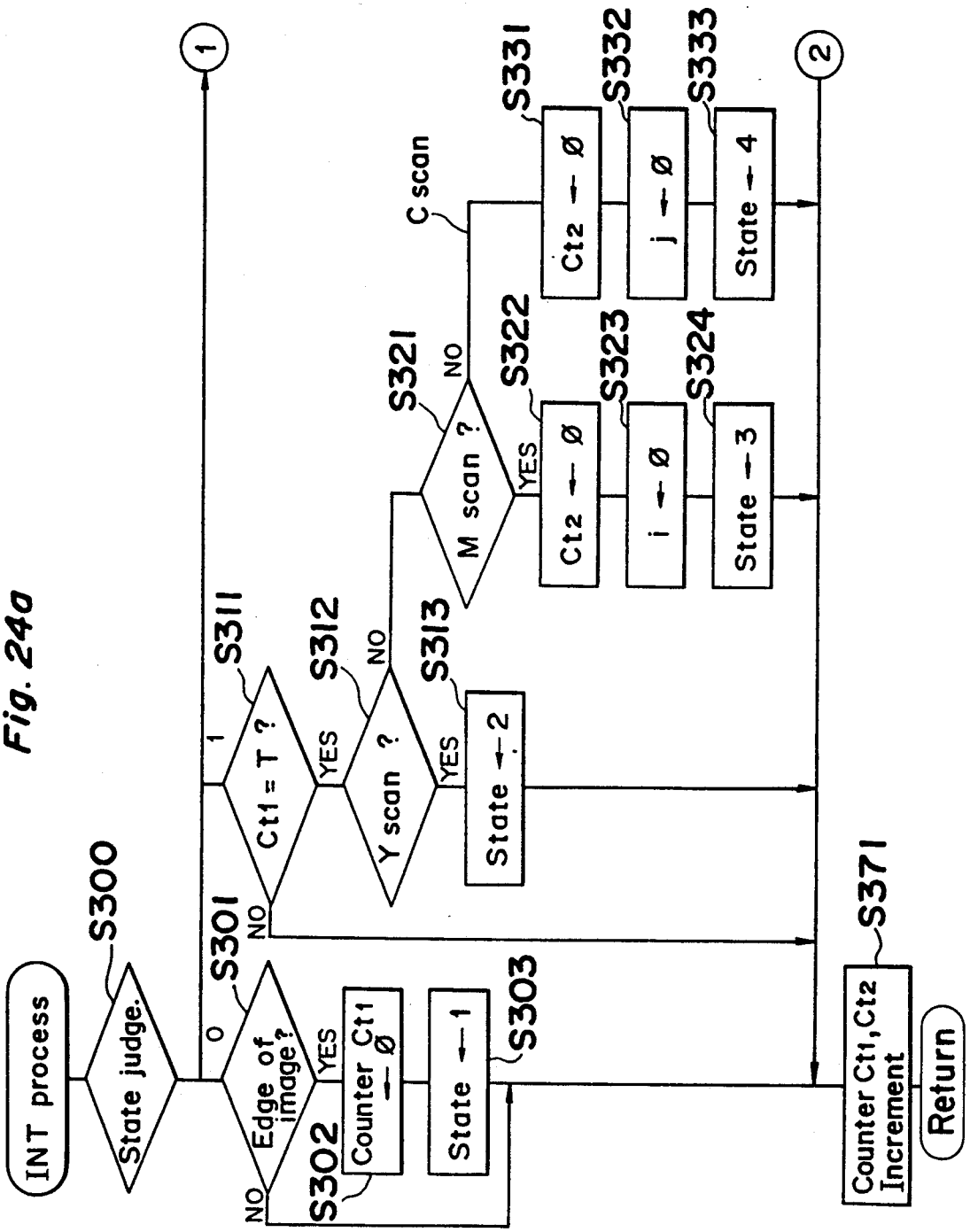
FIGS. 24a and 24b are flow charts of an interruption processing.
Figure 24B:
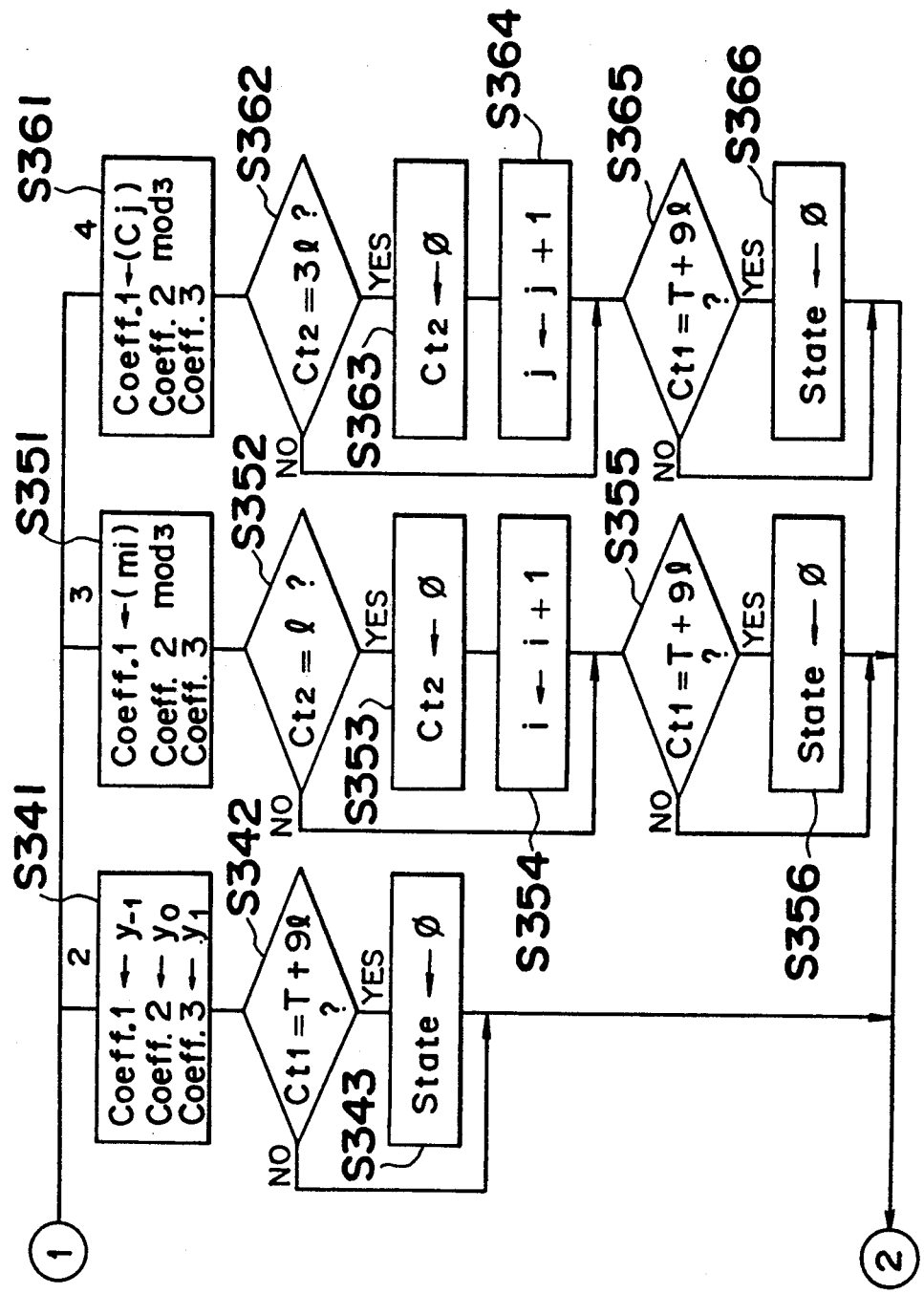

FIGS. 24a and 24b are flow charts of an interruption process for setting the color adjustment coefficients ky, km and kc for making the color adjustment. This interruption process is performed when the horizontal synchronizing signal Hsync is input to the CPU 25 so that the operation of the CPU 25 is interrupted.

In the interruption process, a counter $Ct_1$ counts a distance in the subscan direction Y from the edge of the image formed on a copying paper P shown in FIG. 7 so as to detect the print start point $P_0$ and the print end point $P_1$ of the mosaic monitor image GM. A counter $Ct_2$ counts a distance in the subscan direction so as to detect respective blocks of images of the mosaic monitor image. In FIG. 7, T denotes a distance in the subscan direction between the edge of the image and the print start point of the mosaic monitor image, and l denotes a distance in the subscan direction of one block of the images of the mosaic monitor image. The distance l is set in the image register processing (step S2).

Referring to FIG. 24a, first of all, the program flow goes to either one of step S301, S311, S341, S351 or S361 according to a state number at step S300. It is to be noted that the state number is set at "0" at the beginning of the print operation of the mosaic monitor image.

If the state number is "0" at step S300, it is judged whether or not the scanning point of the document has passed through the edge of the image formed on the copying paper P at step S301. When the scanning point has passed through the edge of the image (Yes at step S301), the counting value of the counter $Ct_1$ is initialized at step S302, and "1" is set at the state number at step S303. Thereafter, the program flow goes to step S371. On the other hand, when the scanning point has not passed through the edge of the image (No at step S301), the program flow goes to step S371, directly.

If the state number is "1" at step S300, it is judged whether or not the counting value of the counter $Ct_1$ is equal to a value T at step S311, i.e., the scanning point reaches the position of the coordinate $y_0$ which is the edge of the mosaic monitor image GM. When the counting value of the counter $Ct_1$ is equal to the value T (Yes at step S311), the program flow goes to either one of steps S313, S322 or S331 according to the color of toner supplied by the development units 45a to 45c. That is, when the color of toner is yellow (Yes at step S312), "2" is set at the state number at step S313. When the color of toner is magenta (Yes at step S321), the counting value of the counter $Ct_2$ is initialized at step S322, "0" is set at the variable i at step S323, and then, "3" is set at the state number at step S324. On the other hand, when the counting value of the counter $Ct_1$ is not equal to the value T (No at step S311), the program flow goes to step S371, directly. When the color of toner is cyan (No at step S321), the counting value of the counter $Ct_2$ is initialized, "0" is set at the variable j at step S332, and "4" is set at the state number at step S333.

If the state number is "2" at step S300, a latch signal is outputted to the color tone setting circuit 2 at step S341 so that the values $y_{-1}$, $y_0$ and $y_{+1}$ are latched as the coefficients 1 to 3 at the latches 302, 303 and 304, respectively, and thereafter, it is judged whether or not the counting value of the counter $Ct_1$ is equal to a value (T+9l) at step S342, i.e., the scanning point reaches the position of the coordinate $y_0$ which is the last edge of the mosaic monitor image GM. When the counting value of the counter $Ct_1$ is equal to the value (T+9l) (Yes at step S342), "0" is set at the state number at step S343, and then, the program flow goes to step S371. On the other hand, when the counting value of the counter $Ct_1$ is not equal to the value (T+9l) (No at step S342), the program flow goes to step S371, directly.

If the state number is "3" at step 300, the value $m_i$ is set as the coefficients 1 to 3 at the latches 302 to 304 at step S351, and it is judged whether or not the counting value of the counter $Ct_2$ is equal to the value l, i.e., the scanning point has passed through one block of image of the mosaic monitor image GM at step 352. If the counting value of the counter $Ct_2$ is equal to the value l (Yes at step S352), the counting value of the counter $Ct_2$ is initialized at step S353, and the variable i is increased by one at step S354. Thereafter, the program flow goes to step S355. On the other hand, if the counting value of the counter $Ct_2$ is not equal to the value ; (No at step S352), the program flow goes to step S355, directly. At step S355, it is judged whether or not the counting value of the counter $Ct_1$ is equal to the value (T+9l), i.e., the scanning point reaches the last edge of the mosaic monitor image. If the counting value of the counter $Ct_1$ is equal to the value (T+9l) (Yes at step S355), "0" step is set at the state number at S356, and the program flow goes to step S371. On the other hand, if the counting value of the counter $Ct_1$ is not equal to the value (T+9l) (No at step S355), the program flow goes to step S371, directly. That is, in the process of the state number "3", the same value $m_i$ is set at the coefficients 1 to 3, and also the coefficients 1 to 3 are altered to the new value $m_i+1$ every time the scanning point reaches the next block of image of the mosaic monitor image in the subscan direction Y.

If the state number is "4" at step 300, the value Cj is set as the coefficients 1 to 3 at the latches 302 to 304 at step 361, it is judged whether or not the counting value of the counter $Ct_2$ is equal to a value (3l), i.e., the scanning point has passed through three blocks of images of the mosaic monitor monitor image at step S362. If the counting value of the counter $Ct_2$ is equal to the value (3l) (Yes at step S362), the counting value of the counter $Ct_2$ is initialized at step S363, and the variable j is increased by one at step S364, and thereafter, the program flow goes to step S365. On the other hand, if the counting value of the counter $Ct_2$ is not equal to the value (3l) (No at step S362), the program flow goes to step S365, directly.

At step S365, it is judged whether or not the counting value of the counter $Ct_1$ is equal to the value (T+9l), i.e., the scanning point reaches the last edge of the mosaic monitor image at step S365. If the counting value of the counter $Ct_1$ is equal to the value (T+9l) (Yes at step S365), "0" is set at the state number at step S366, and then, the program flow goes to step S371. On the other hand, if the counting value of the counter $Ct_1$ is not equal to the value (T+9l) (No at step S365), the program flow goes to step S371, directly. In the above process of the state number "4", the same value Cj is set as the coefficients 1 to 3 at the latches 302 to 304, and the coefficients 1 to 3 are altered to the new value Cj+1 every time the scanning point passes through three blocks of images of the mosaic monitor image in the subscan direction.

After respective above processes of the state numbers "1" to "4", respective counting values of the counters $Ct_1$ and $Ct_2$ are increased by one at step S371, and then, the program flow returns. When the above processes are completed, various coefficients are set at respective blocks of images corresponding to respective printing colors so that the color adjustment has been made for the mosaic monitor image.

FIG. 25 is a flow chart of the output setting processing of the superimpose image (step S6).

Referring to FIG. 25, it is judged whether or not there are plural register images at step S201. If there are plural register images (Yes at step S201), the operator is made to select the plural register images by displaying the message on the display section 84 at step S202. After the selection of the register images is completed (Yes at step S203), the program flow goes to step S205. On the other hand, if there is one register image (No at step S201), the register image is made the selected image at step S204, and then, the program flow goes to step S205.

Thereafter, the fixed offset address for setting the address corresponding to the register image is set at step S205, and the image data of the selected image is set in the image memory circuit 1 according to the set register image mode, and the printing data is outputted at step S206, and then, the program flow returns.

Figure 26:
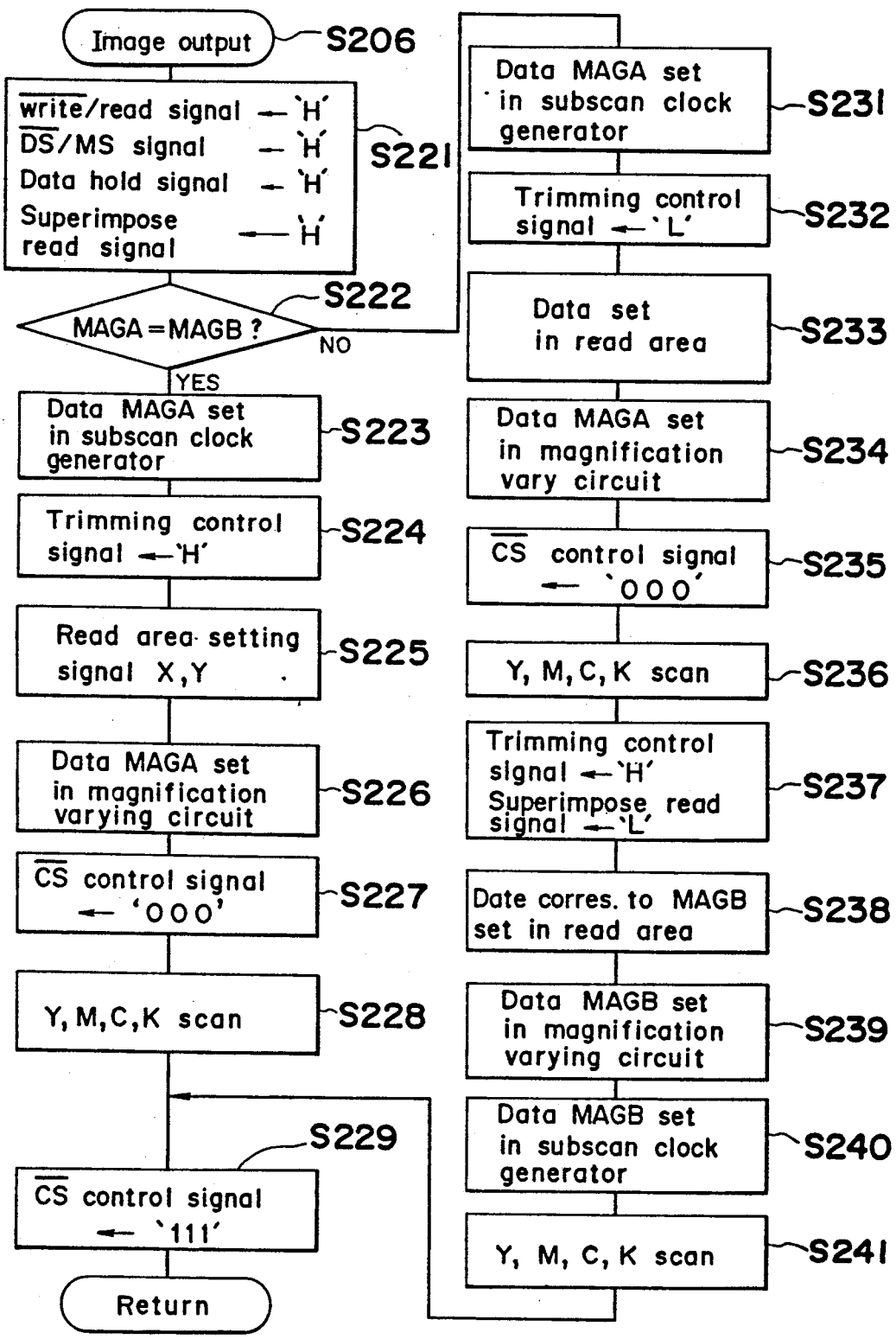
FIG. 26 is a flow chart of an image output processing in the superimpose mode for storing the multi-level image signal.

FIG. 26 is a flow chart of the image output processing in the superimpose mode for storing the multi-level color image (step S206), wherein MAGA is the magnification of the image to be printed to the document image, and MAGB is the magnification of the image to be printed to the superimpose image stored in the memory 401.

Referring to FIG. 26, the $\overline{\text{write}}$/read signal is made a High level, the binary storing/multi-level storing signal is made a High level, the data hold signal is made a High level, and the superimpose read signal is made a High level at step S221.

Thereafter, it is judged whether or not the magnification MAGA is equal to the magnification MAGB at step S222.

When the magnifications MAGA=MAGB (Yes at step S222), the magnification data MAGA is set in the subscan clock generator 29 at step S223, the trimming control signal is made a High level at step S224, the CPU 25 outputs the read area setting signals X and Y to the read area judgment circuit 408 at step S225, and the magnification data MAGA is set in the magnification varying circuit 26 at step S226. Thereafter, the chip select control signal $\overline{CS}$ is made "000" at step S227, all the memories 401a, 401b and 401c are selected, and image data of Y, M, C and K colors are read out at step S228.

After the scan operation for reading out the image data of Y, M, C and K colors is completed, the chip select control signal $\overline{CS}$ is made "111" at step S229, and reading out of the image data stored in the memory 401 is inhibited, and then, the program flow returns.

If the magnification MAGA is not equal to the magnification MAGB (No at step S222), first of all, the document image of out of the read area is printed on a copying paper. Namely, the magnification data MAGA is set in the subscan clock generator 29 at step S231, the trimming control signal is made a Low level at step S232, the selector 426 is made to select white data in the read area, the CPU 25 outputs the read area setting signals X and Y which the difference between the magnifications MAGA and MAGB is taken into consideration to the read area judgment circuit 408, and the magnification data MAGA is set in the magnification varying circuit 26. Thereafter, the chip select control signal $\overline{CS}$ is made "000" at step S235, all the memories 401a, 401b and 401c are selected, and image data of Y, M, C and K colors are read out at step S236.

Thereafter, the image data stored in the memory 401 is superimposed on the read area of the copying paper so to be printed thereon. Namely, the trimming control signal is made a High level, and the superimpose read signal is made a Low level at step S237. Thereafter, the selector 421 is made to select white data, the read area signal corresponding to the magnification MAGB is set in the read area judgment circuit 408 at step S238, the magnification data MAGB is set in the magnification varying circuit 26 at step S239, and the magnification data MAGB is set in the subscan clock generator 29 at step S240. Thereafter, the superimpose image data of Y, M, C and K colors are read out at step S241. After the scan operation is completed, the chip select control signal $\overline{CS}$ is made "111" at step S229 so that reading out of the image data stored in the memory 401 is inhibited, and then, the program flow returns.

FIG. 27 is a flow chart of the image output processing in the superimpose mode for storing the binary color image signal (step S206).

Referring to FIG. 27, in the image memory circuit 1, the binary storing/multi-level storing signal is made a Low level at step S251, the data hold signal is made a High level at step S252, the superimpose read signal is made a High level at step S253, and the trimming control signal is made a High level at step S254. Thereafter, the equal magnification data is set in the subscan clock generator 29 at step S255, the read area setting signals X and Y are input to the read area judgment circuit 408, and the write/read signal is made a High level at step S257.

Thereafter, the chip select control signal $\overline{CS}$ is made "110" at step S261, the memory 401a is selected, and the image data of yellow color is read out at step S262.

The chip select control signal $\overline{CS}$ is made "101" at step S263, the memory 401b is selected, and the image data of magenta color is read out at step S264. Thereafter, the chip select control signal $\overline{CS}$ is made "001" at step S265, the memory 401c is selected, and the image data of cyan color is read out at step S266. Furthermore, the chip select control signal $\overline{CS}$ is made "111" at step S267, and the image data of black color is read out at step S268, and then, the program flow returns.

FIG. 28 is a flow chart of the image output processing in the superimpose mode for storing the binary mono-color image signal (step S206).

Referring to FIG. 28, in the image memory circuit 1, the binary storing/multi-level storing signal is made a Low level, the data hold signal is made a High level, the superimpose read signal is made a High level, and the trimming control signal is made a High level at step S281. Thereafter, the equal magnification data is set in the subscan clock generator 29 at step S282, the read area setting signals X and Y are input to the read area judgment circuit 408 at step S283, the memory selecting data A is made "110", "101", or "001" at step S284, and the write/read signal is made a High level at step S285.

Thereafter, it is judged whether or not the image of the image data of yellow color stored in the memory 401 is printed at step S286. If the image of the image data of yellow color is printed (Yes at step S286), the chip select control signal $\overline{CS}$ is made the memory selecting data A at step S286. If the image data of yellow color is not printed (No at step S286), the chip select control signal $\overline{CS}$ is made "111" at step S287. Then, the register image of yellow color is superimposed on the document image so as to be printed thereon.

The above process is performed repeatedly for magenta, cyan and black colors.

Finally, the chip select control signal $\overline{CS}$ is made "111", and the data hold signal is made a High level at step S290, and then, the program flow returns.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A digital copying machine comprising:
    image reading means for reading a document image so as to generate a multi-level image signal corresponding to the density of the document image;
    image signal altering means for altering the multi-level image signal generated by said image reading means;
    converting means for converting the altered multi-level image signal outputted from said image signal altering means into a binary image signal;
    image forming means for forming an image on a copying paper in accordance with the binary image signal outputted from said converting means;
    memory means for storing the multi-level or binary image signal;
    mode selecting means for selecting a first mode for storing the multi-level image signal generated by said image reading means in said memory means and a second mode for storing the binary image signal in said memory means;
    connecting means for connecting said memory means with said image reading means so as to store a multi-level image signal of a first document generated by said image reading means in said memory means when the first mode is selected by said mode selecting means, and for connecting said memory means with said converting means so as to store a binary image signal in said memory means when the second mode is selected by said mode selecting means; and
    superimposing means for connecting said memory means with the input terminal of said image signal altering means or said image forming means upon forming an image of a second document so as to read out the multi-level or binary image signal stored in said memory means and superimpose the image of the first document on the image of the second document on a copying paper.

2. The digital copying machine as claimed in claim 1, wherein said image signal altering means comprises a color tone correction means for correcting a color tone of an image.

3. The digital copying machine as claimed in claim 1, wherein said image signal altering means comprises a magnification varying means for varying a magnification of an image to be copied.

4. The digital copying machine as claimed in claim 1, further comprising:
first area specifying means for specifying any area on the first document; and
write area control means for controlling the area of the image to be stored in said memory means so as to store only the image signal of the area specified by said first area specifying means in said memory means.

5. The digital copying machine as claimed in claim 4, further comprising:
second area specifying means for specifying any area on the second document; and
read area control means for controlling a read timing of the image signal from said memory means so as to superimpose the image of the first document stored in said memory means on any area specified by said second area specifying means.

6. An image forming apparatus comprising:
binarizing circuit for converting a multi-level image signal corresponding to the density of the image into a binary image signal;
image forming means for forming an image in accordance with the binary image signal outputted from said binarizing circuit;
memory means for storing a binary image signal or a multi-level image signal;
selecting means for selecting to store a multi-level image signal or to store a binary image signal is said memory means;
writing circuit for storing a multi-level image signal of a first image before conversion of said binarizing circuit when storing a multi-level image signal is selected by said selecting means, and for storing the binary image signal of the first image after conversion of said binarizing circuit when storing a binary image signal is selected by said selecting means; and
reading circuit for reading out the multi-level image signal or the binary image signal of the first image stored in said memory means;
wherein a multi-level image signal is outputted to said image forming means through the binarizing circuit when a multi-level image signal is read out from said memory means, and a binary image signal is outputted directly to said image forming means when a binary image signal is read out from said memory means.

7. The image forming apparatus as claimed in claim 6, wherein said reading circuit reads out the image signal from said memory means upon forming the second image and superimpose the second image on the first image.

8. A digital copying machine comprising:
image reading means for reading a document image so as to generate a image signal of the document image; wherein said image reading means comprising image sensor means for generating a multi-level image signal corresponding to the density of the image and converting means for converting the multi-level image signal generated by said image sensor means into a binary image signal;
memory means for storing the image signal, said memory means having a capacity for storing plural images;
image forming means for forming an image on a copying paper in accordance with the image signal generated by said image reading means;
mode selecting means for selecting a first mode for storing an image as a multi-level image signal in said memory and a second mode for storing an image as a binary image signal in said memory means;
register means for registering the image signal generated by said image reading means in the memory means; wherein said register means registers the multi-level image signal in said memory means when the first mode is selected, and said register means registers the binary image signal in said memory means when the second mode is selected;
image selecting means for selecting a desirable image from plural images stored in said memory means; and
superimposing means for reading out the multi-level image signal or binary image signal selected by said image selecting means from said memory means upon forming an image by said image forming means in accordance with the image signal outputted from said image reading means, and for superimposing the document image read by said image reading means on the image read from said memory means.

9. The digital copying machine as claimed in claim 8, further comprising:
registered image area specifying means for specifying an area of the image registered in said memory means by said register means.

* * * * *